US012638735B2

(12) United States Patent
　　　Kawase

(10) Patent No.:　US 12,638,735 B2
(45) Date of Patent:　May 26, 2026

(54) LIGHT-EMITTING DEVICE AND DISPLAY APPARATUS

(71) Applicant: SATURN LICENSING LLC, New York, NY (US)

(72) Inventor: Mitsuhiro Kawase, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/854,070

(22) PCT Filed: Mar. 13, 2023

(86) PCT No.: PCT/JP2023/009656

§ 371 (c)(1),
(2) Date: Oct. 4, 2024

(87) PCT Pub. No.: WO2023/210191

PCT Pub. Date: Nov. 2, 2023

(65) Prior Publication Data

US 2025/0224641 A1　　Jul. 10, 2025

(30) Foreign Application Priority Data

Apr. 27, 2022　(JP) ................................. 2022-073701

(51) Int. Cl.
　　*G02F 1/1362*　　　(2006.01)
　　*G02F 1/1333*　　　(2006.01)
　　　　　　(Continued)

(52) U.S. Cl.
　　CPC .. *G02F 1/136286* (2013.01); *G02F 1/133328* (2021.01); *G02F 1/133603* (2013.01); *G02F 1/133614* (2021.01)

(58) Field of Classification Search
　　CPC ......... G02F 1/136286; G02F 1/133614; G02F 1/133328; G02F 1/133603
　　See application file for complete search history.

(56) References Cited

U.S. PATENT DOCUMENTS

2021/0356115 A1* 11/2021 Shimizu ................ F21V 23/002

FOREIGN PATENT DOCUMENTS

JP　　2012-048944 A　　3/2012
JP　　2018-098112 A　　6/2018
　　　　　(Continued)

*Primary Examiner* — David Y Chung
(74) *Attorney, Agent, or Firm* — Richard LaPeruta

(57) ABSTRACT

A light-emitting device is provided that has superior reliability while coping with high integration of light sources. The light-emitting device includes light source units, a relay member, and a pressure contact terminal. The light source units each include a light source board extending in a first direction, multiple light sources arranged in the first direction on the light source board, and a first terminal that is coupled to the multiple light sources. The relay member is opposed to the multiple light source units in a second direction intersecting with the first direction, and includes multiple second terminals that are each electrically coupled to a corresponding one of the first terminals of the multiple light source units. The pressure contact terminal is brought into pressure contact with at least one of the first terminal or the second terminal by mechanical biasing force and electrically couples the first terminal and the second terminal.

20 Claims, 18 Drawing Sheets

(51) Int. Cl.
    *G02F 1/1335*       (2006.01)
    *G02F 1/13357*     (2006.01)

(56)              References Cited

FOREIGN PATENT DOCUMENTS

| WO | WO 2012/053442 A1 | 4/2012 |
| WO | WO 2020/022299 A1 | 1/2020 |
| WO | WO 2020/039721 A1 | 2/2020 |

\* cited by examiner

[ FIG. 1A ]
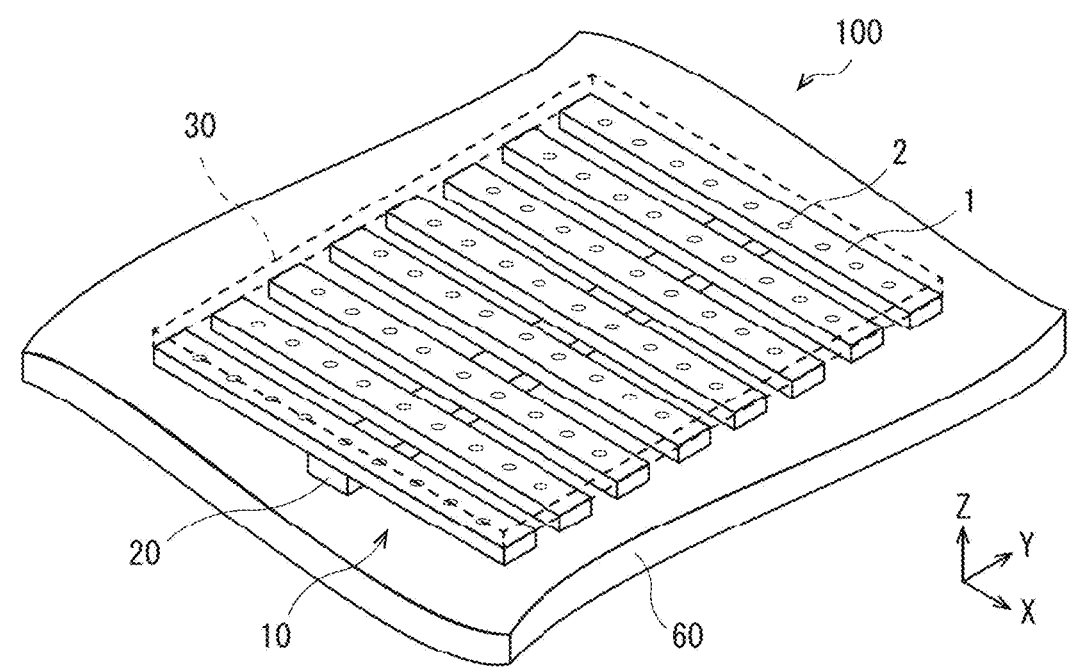
[ FIG. 1B ]
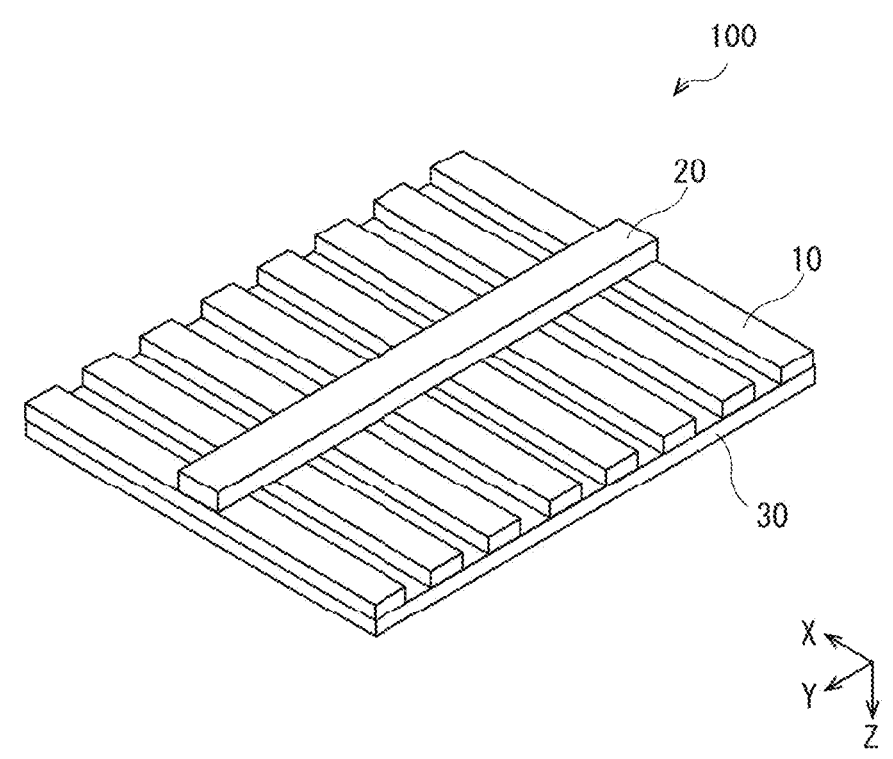

[ FIG. 2A ]
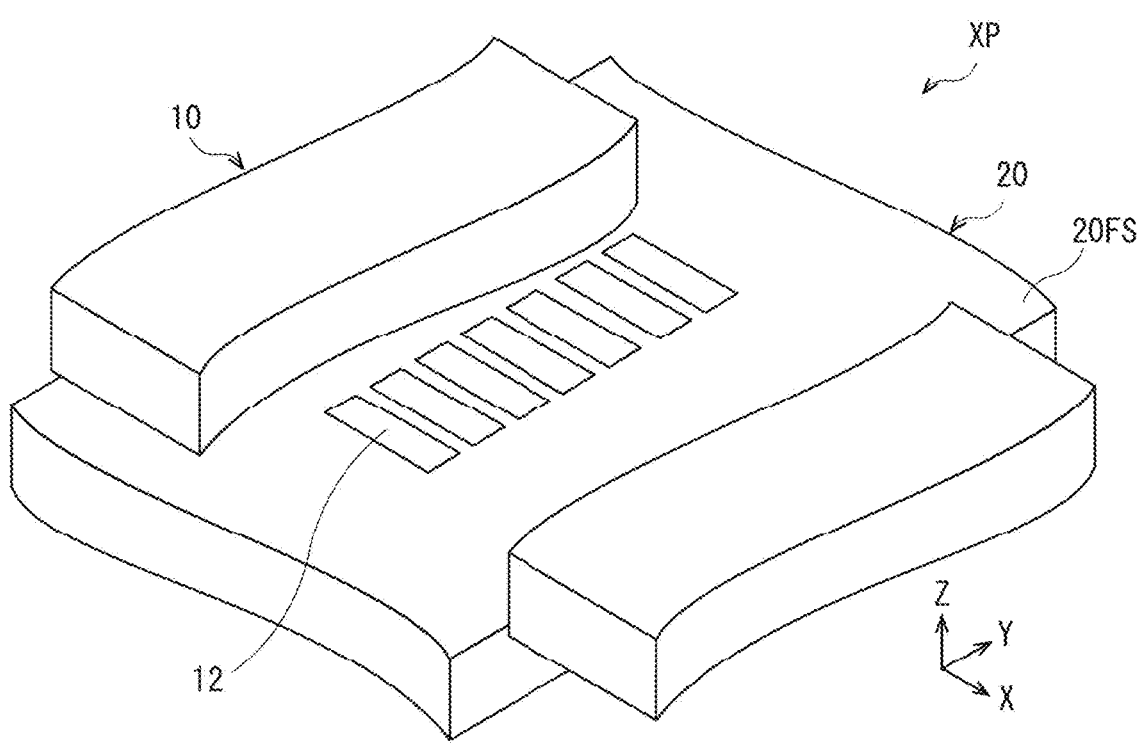
[ FIG. 2B ]
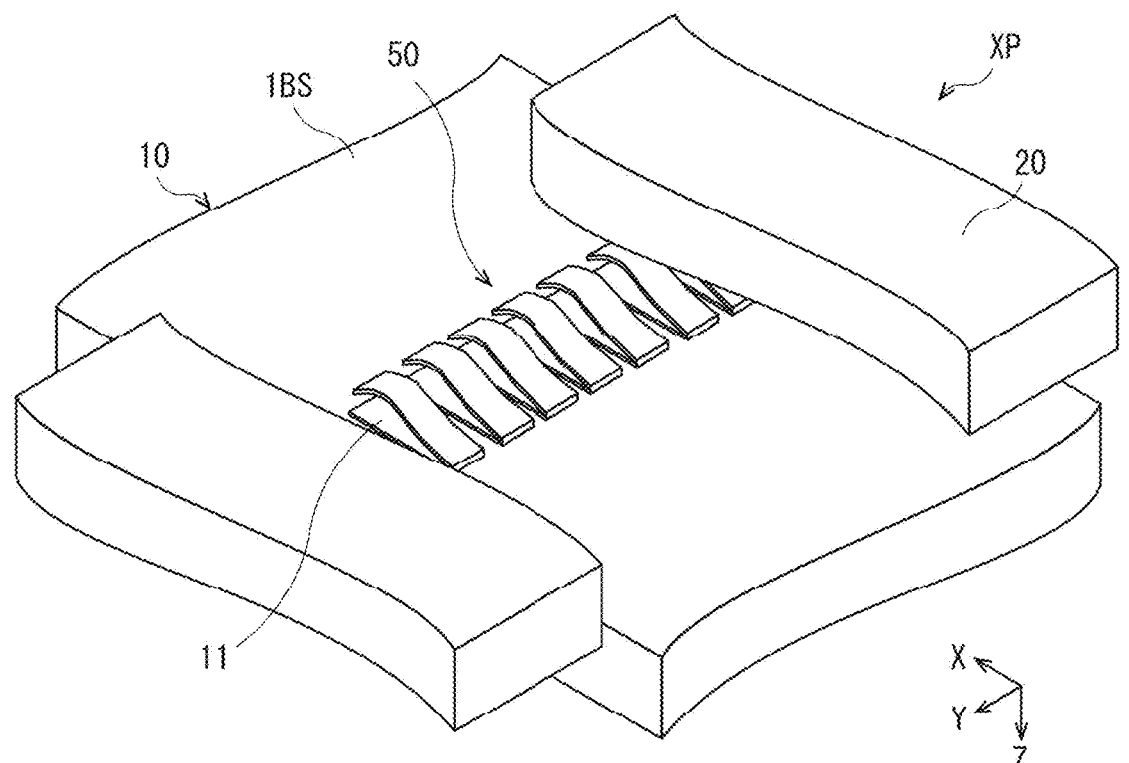

[ FIG. 3 ]
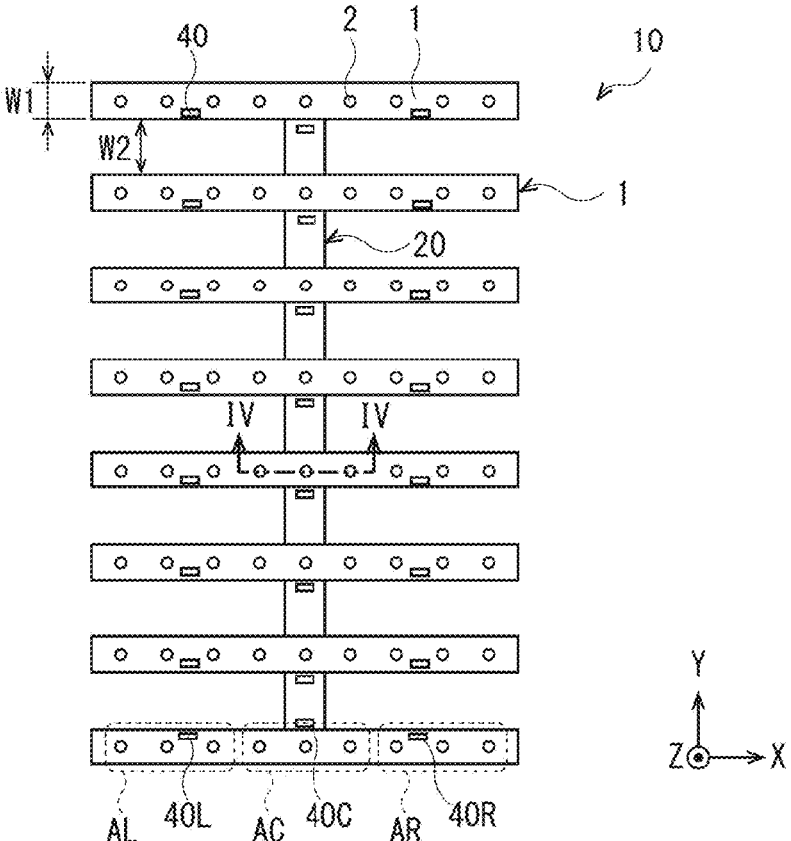

[ FIG. 4 ]
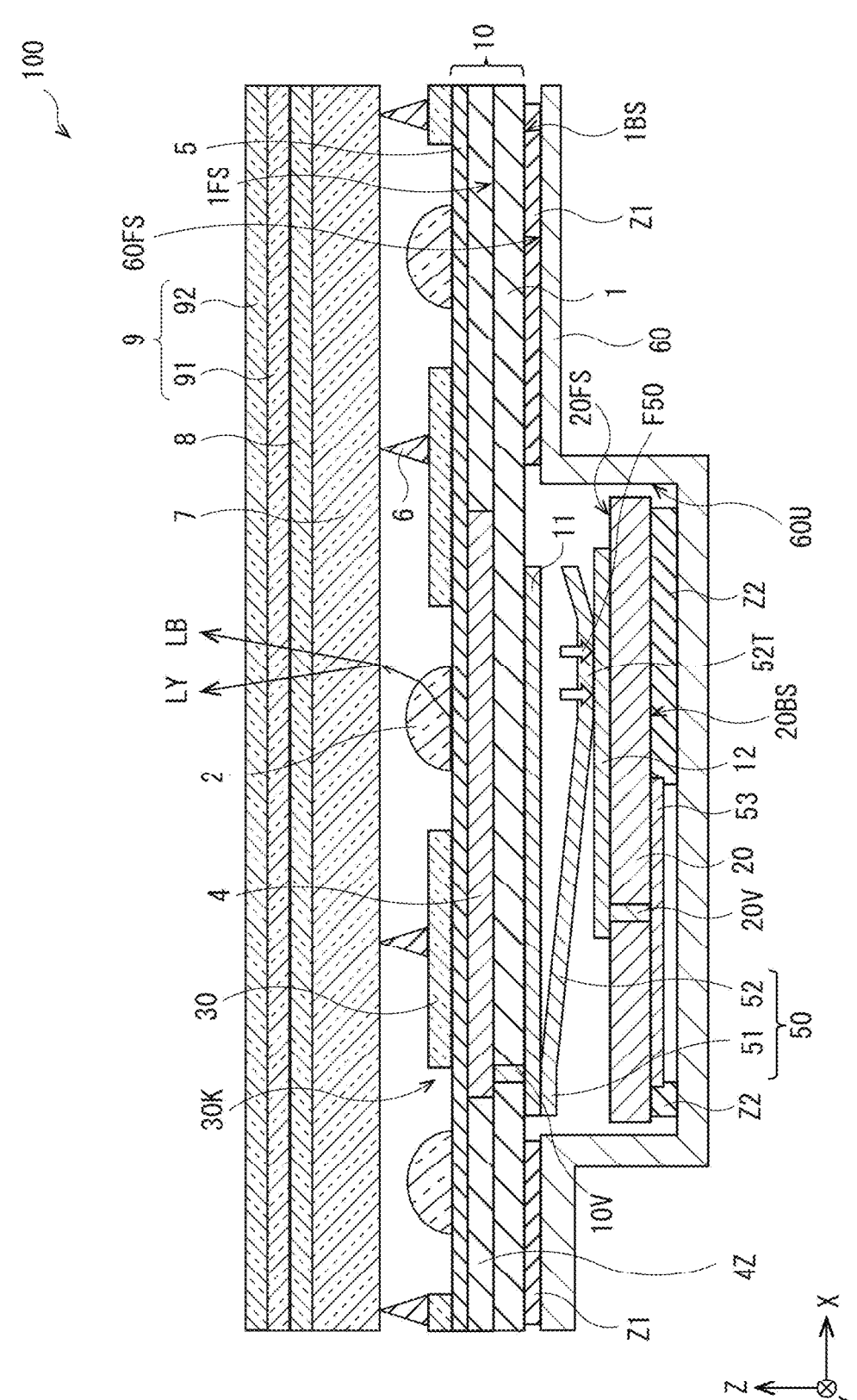

[ FIG. 5 ]
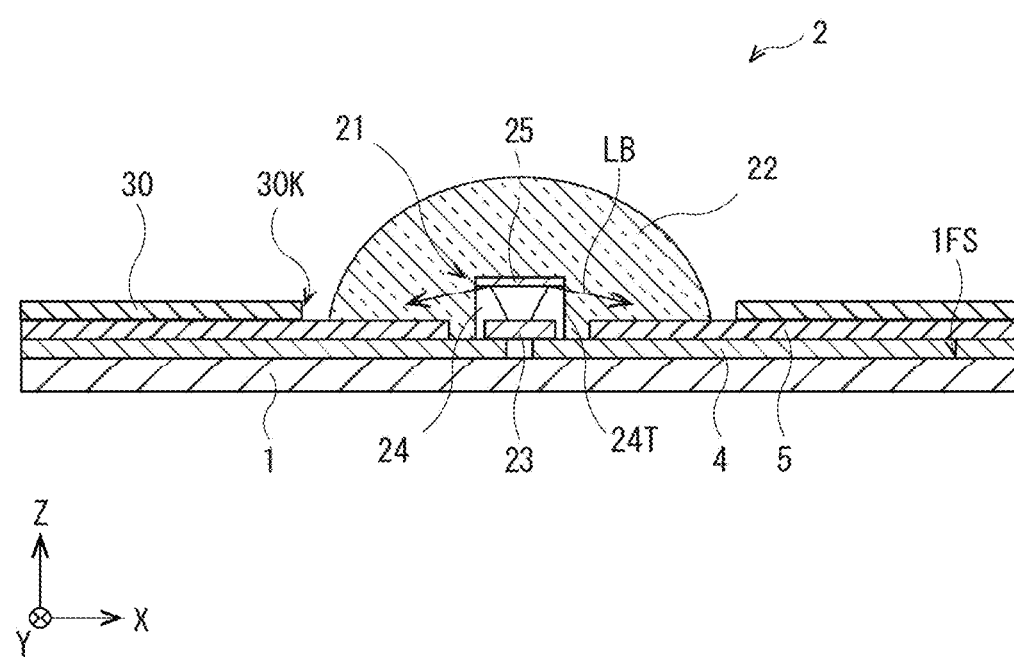
[ FIG. 6 ]
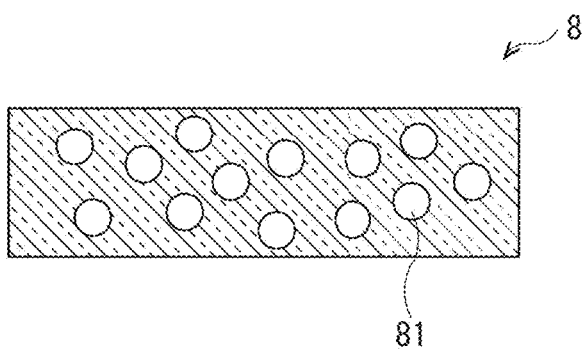

[ FIG. 7 ]
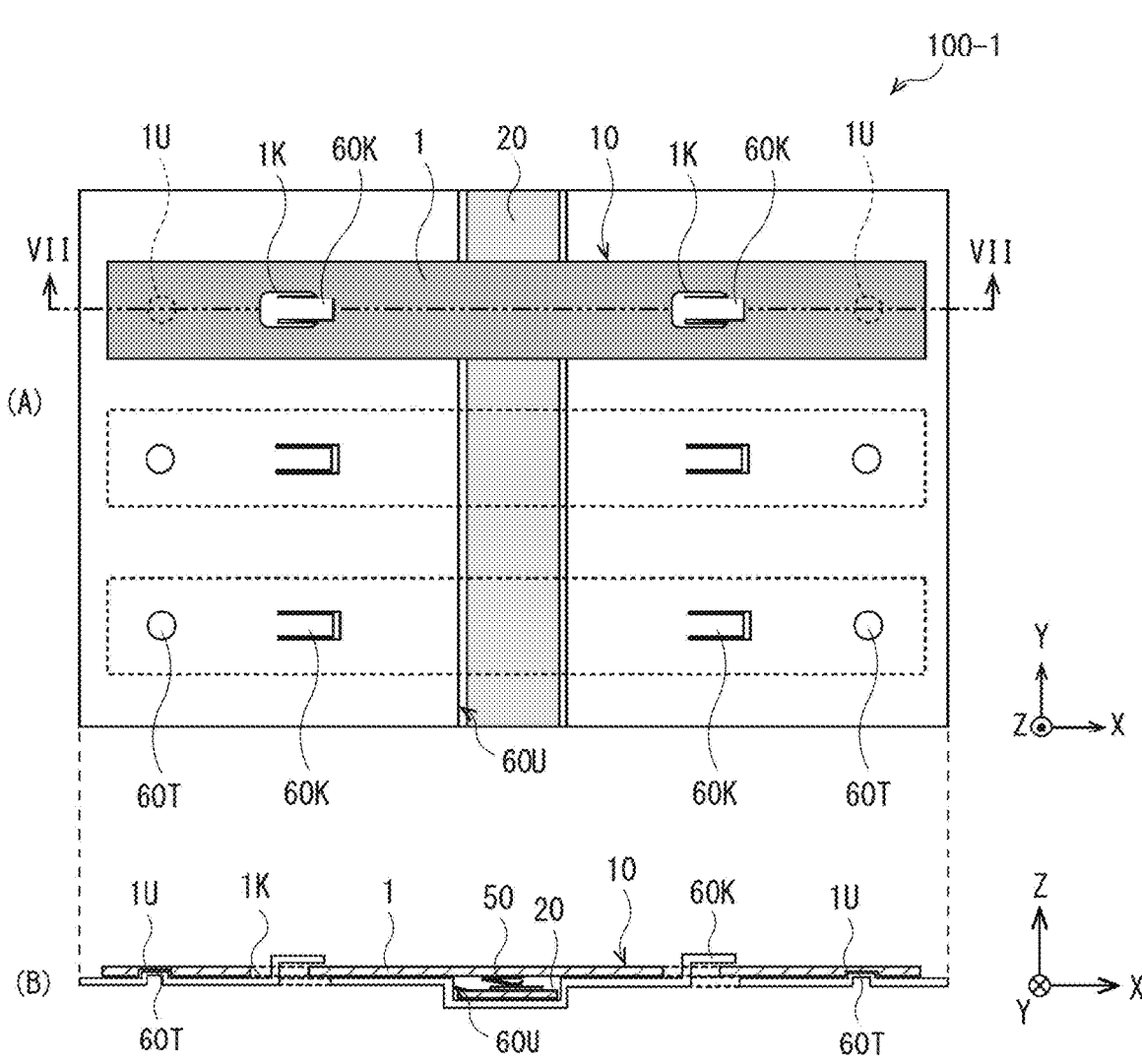

[ FIG. 8 ]
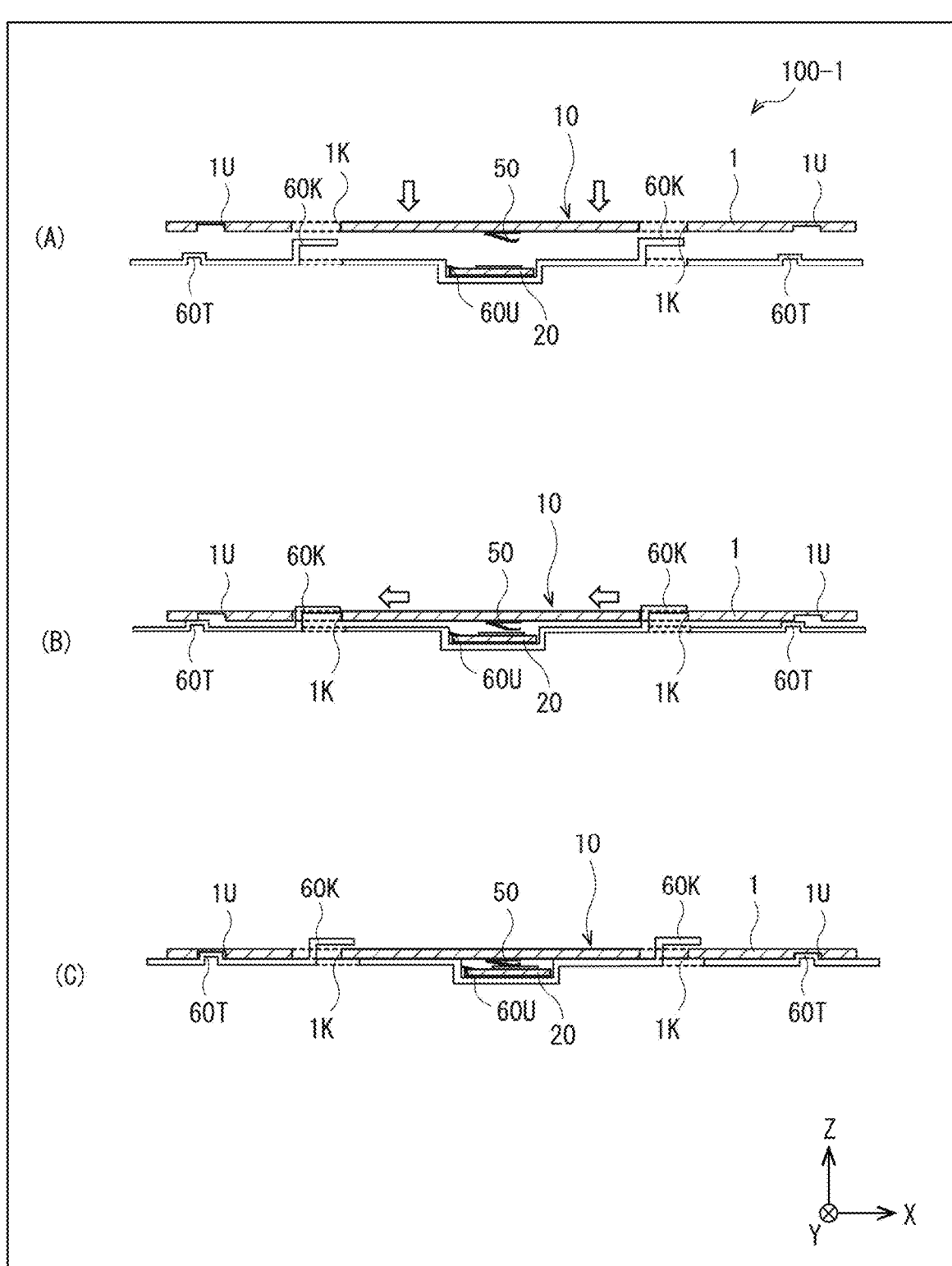

[ FIG. 9 ]
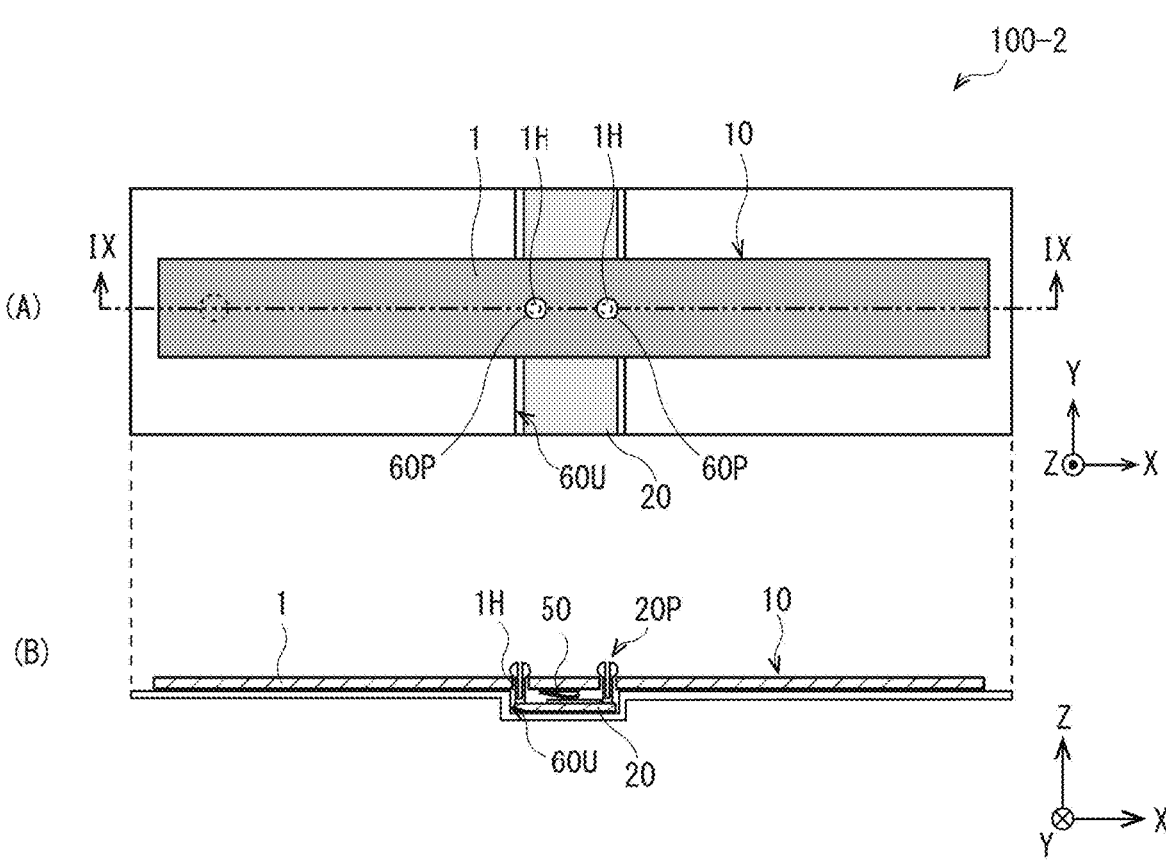

[ FIG. 10 ]
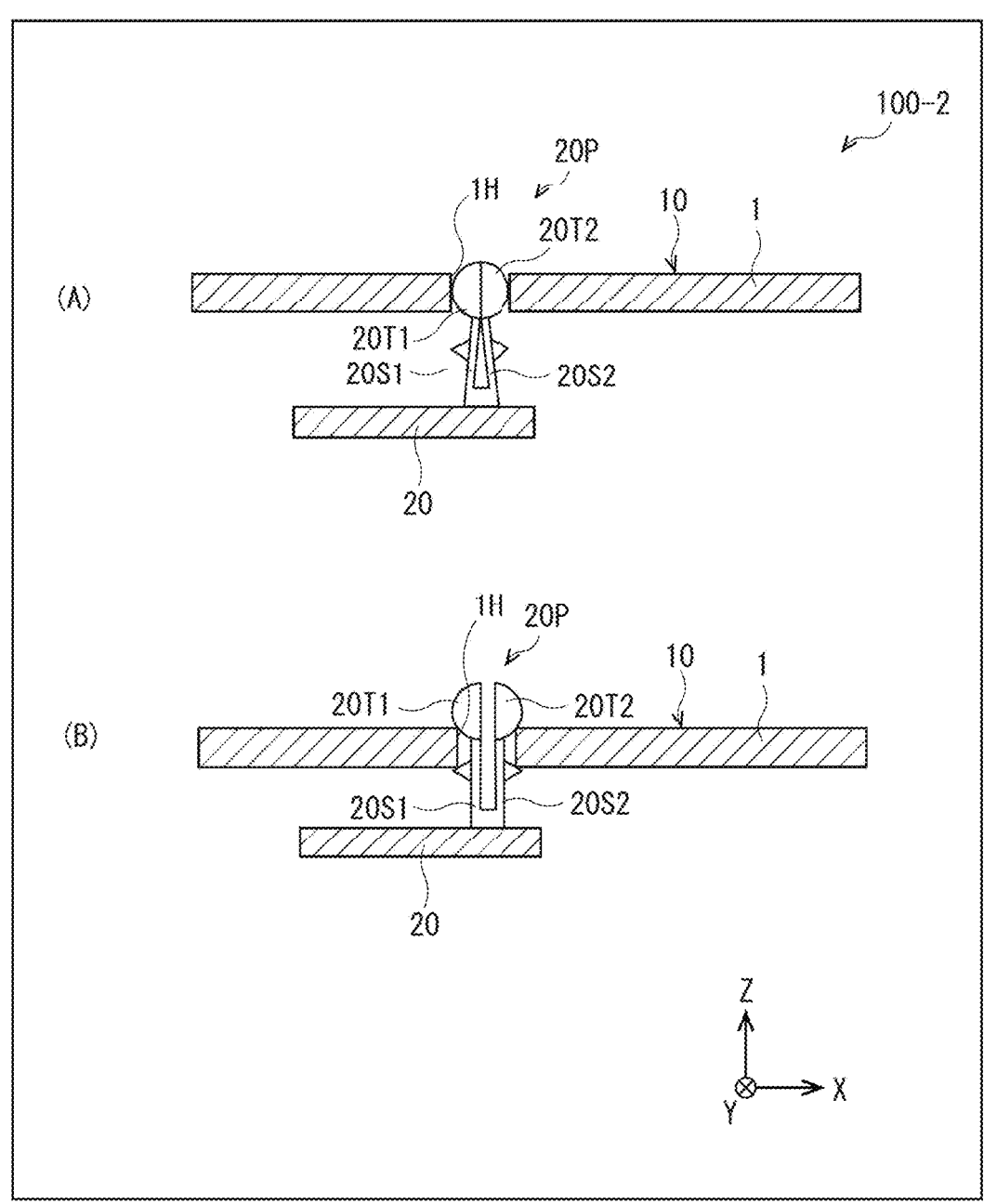

[ FIG. 11 ]
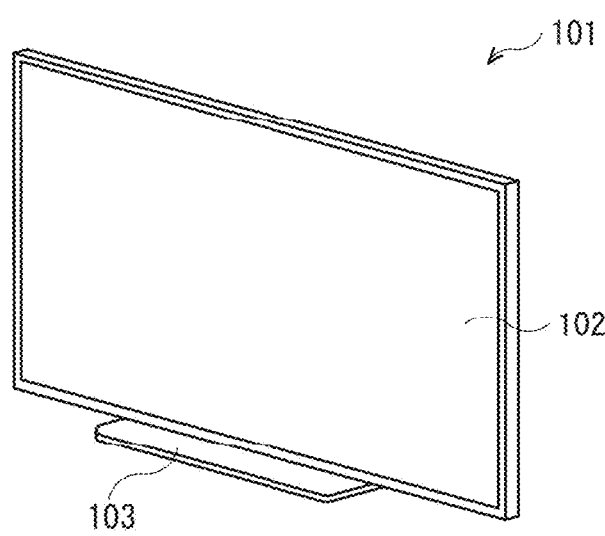

[ FIG. 12 ]
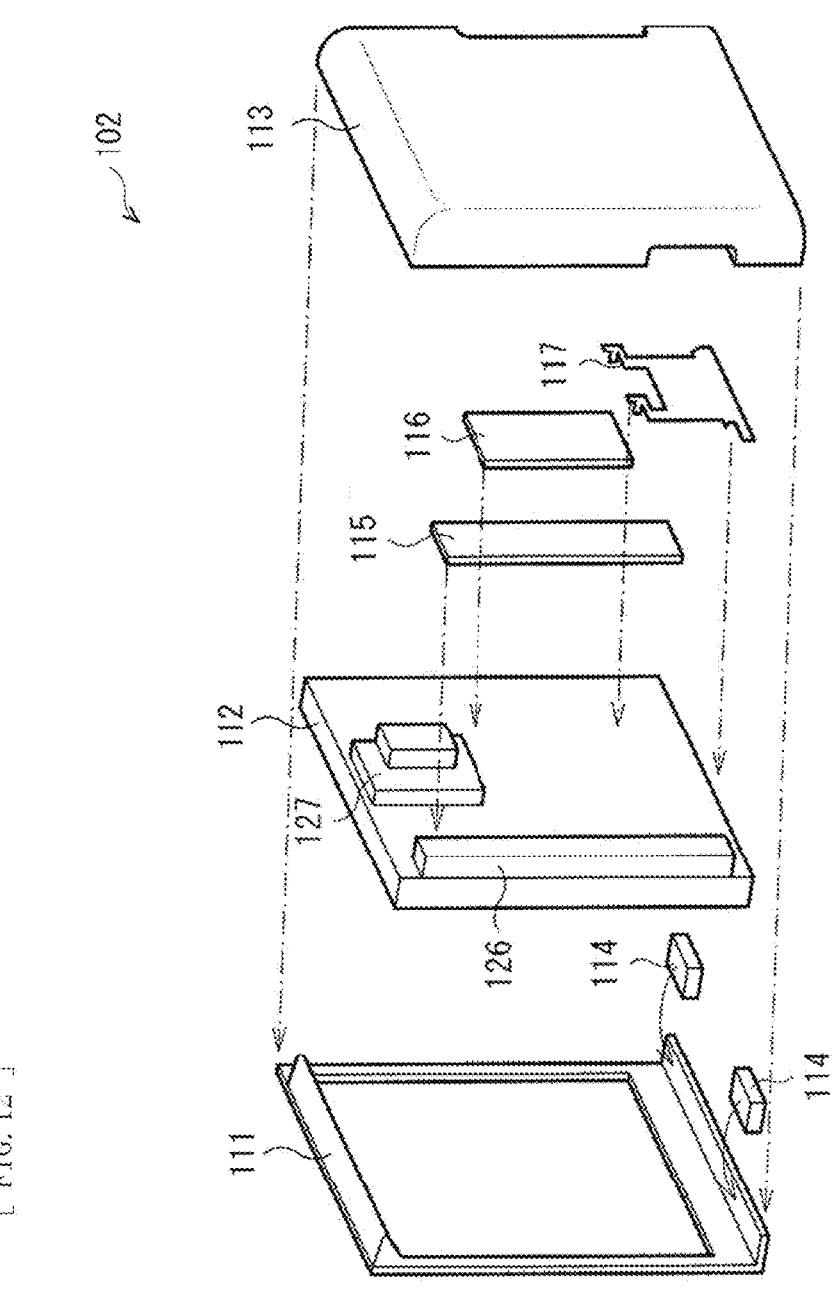

[ FIG. 13 ]
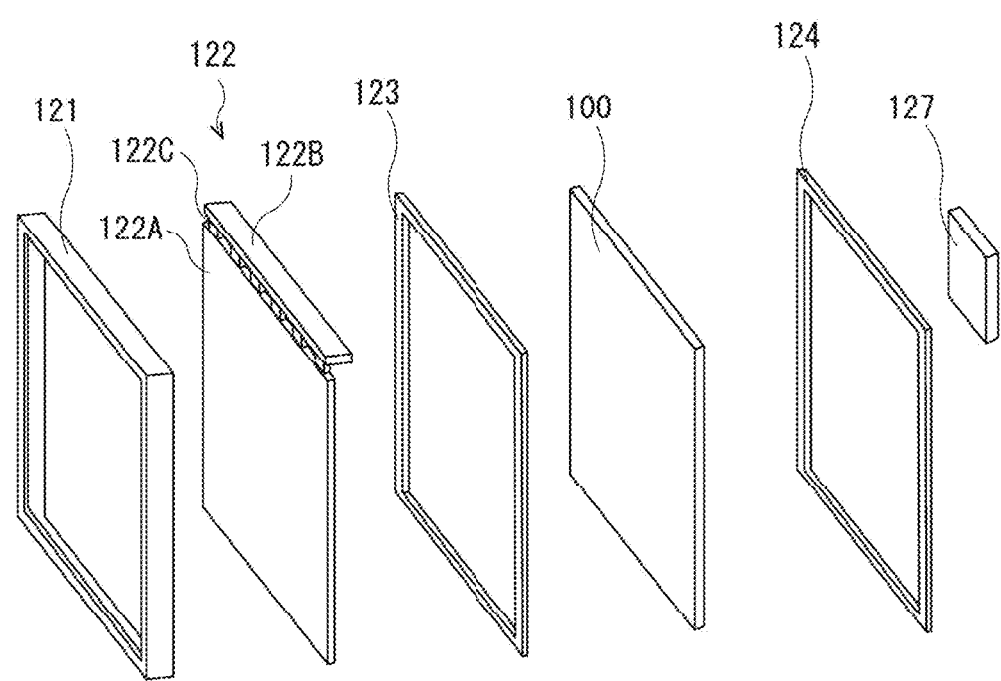

[ FIG. 14 ]
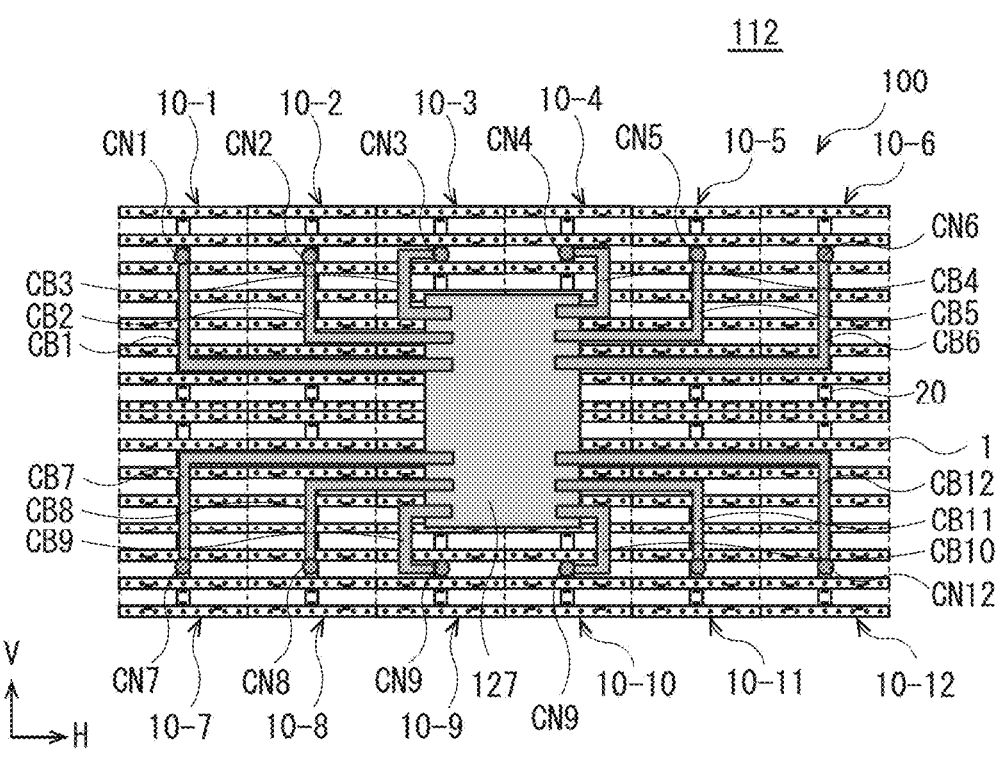

[ FIG. 15 ]
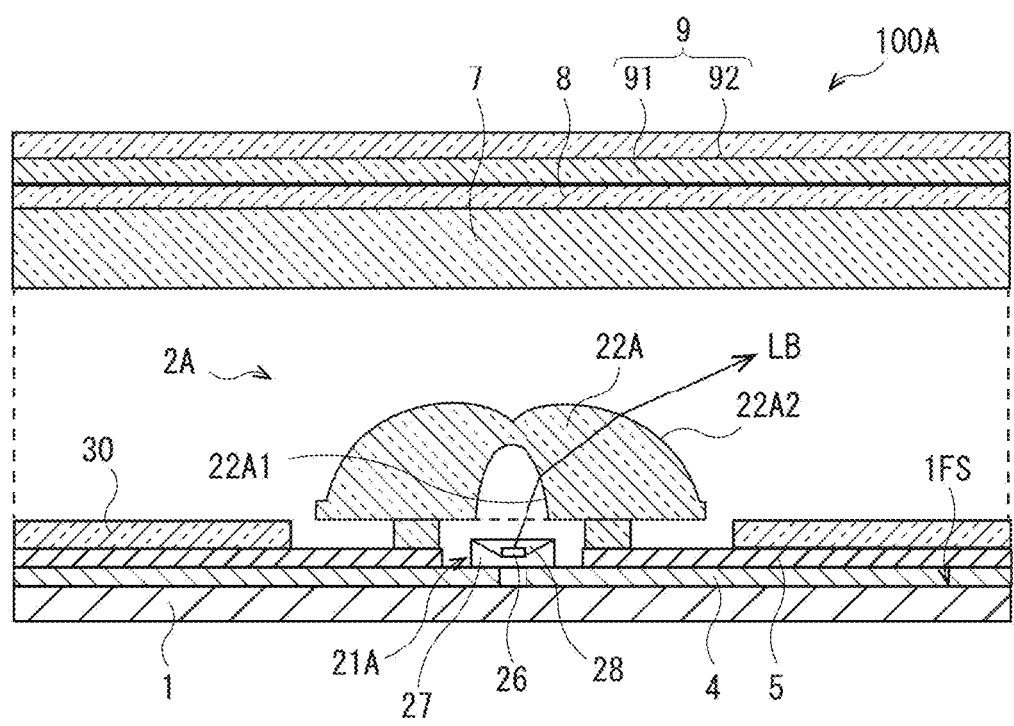
[ FIG. 16 ]
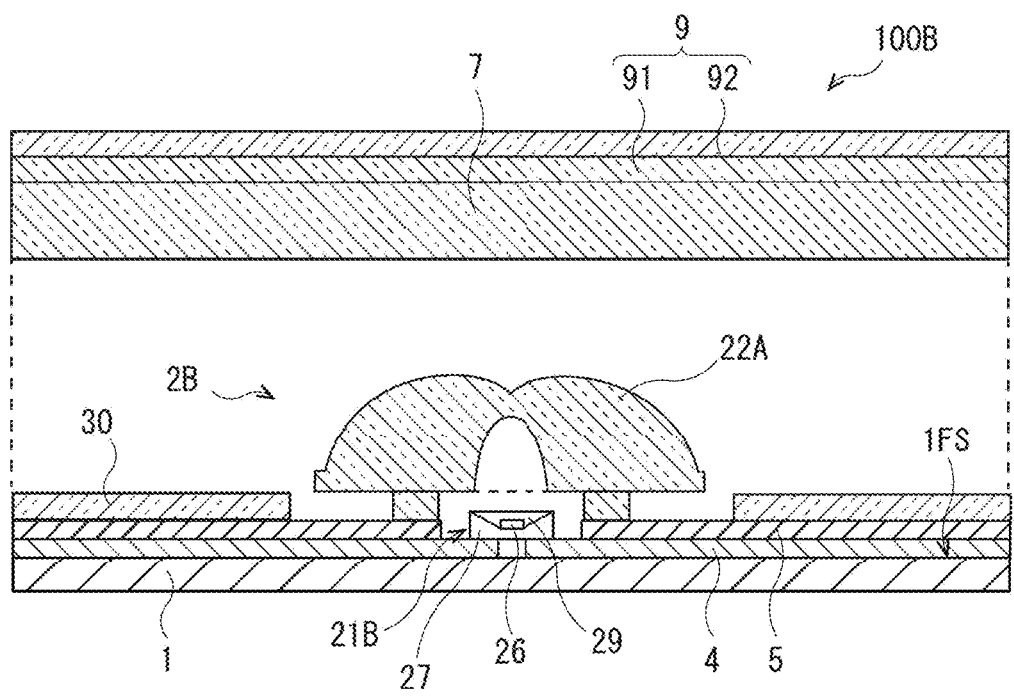

[ FIG. 17 ]
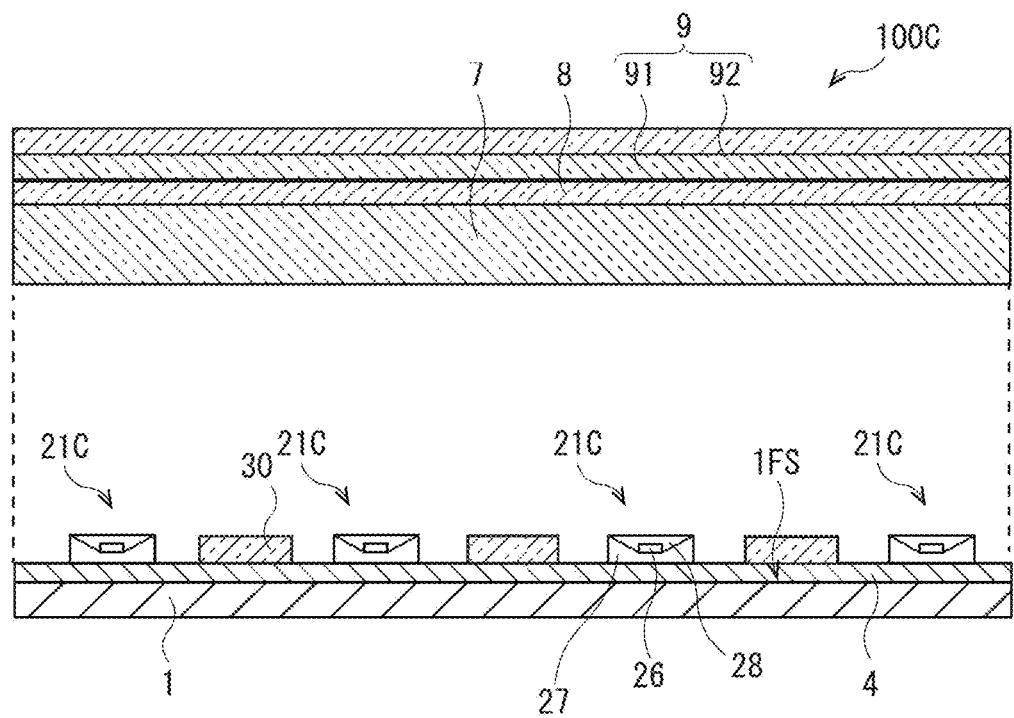
[ FIG. 18 ]
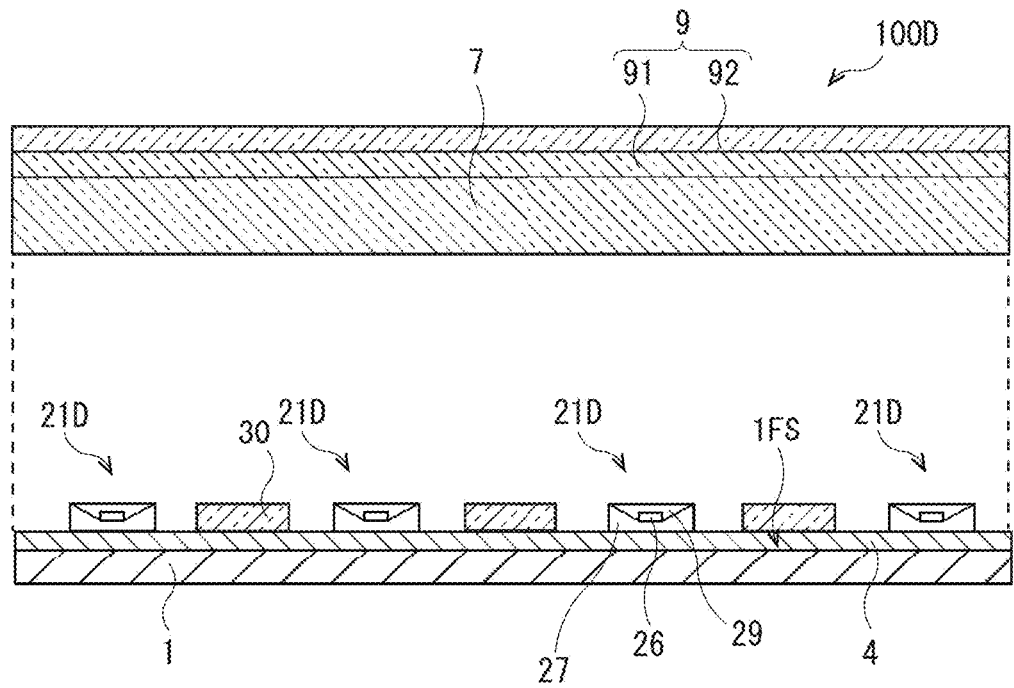

[ FIG. 19 ]
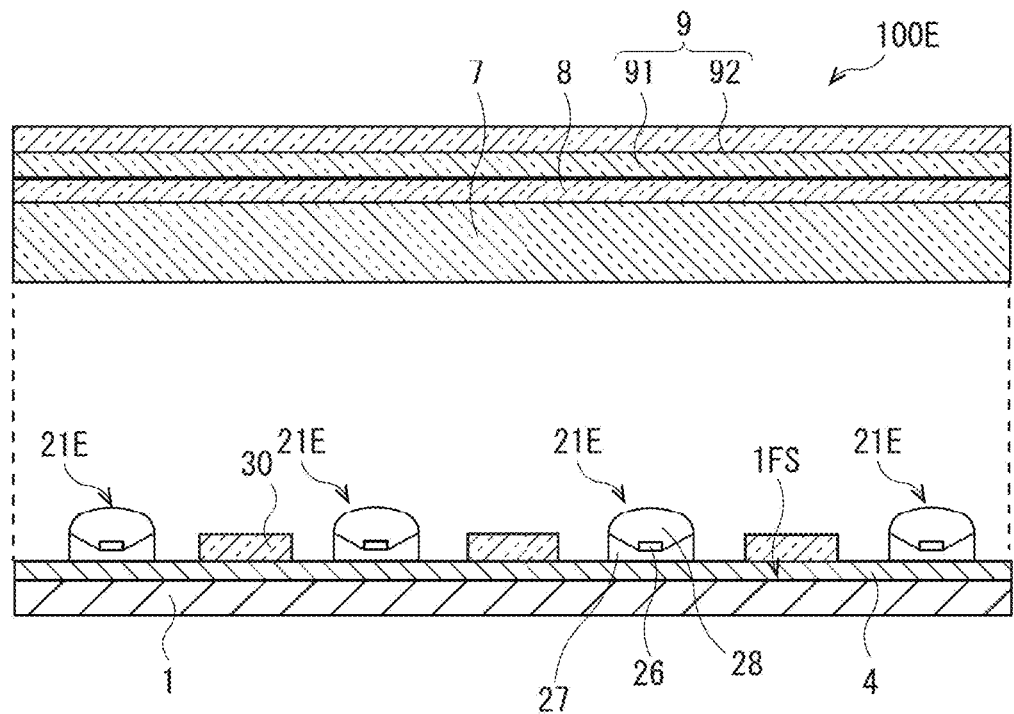
[ FIG. 20 ]
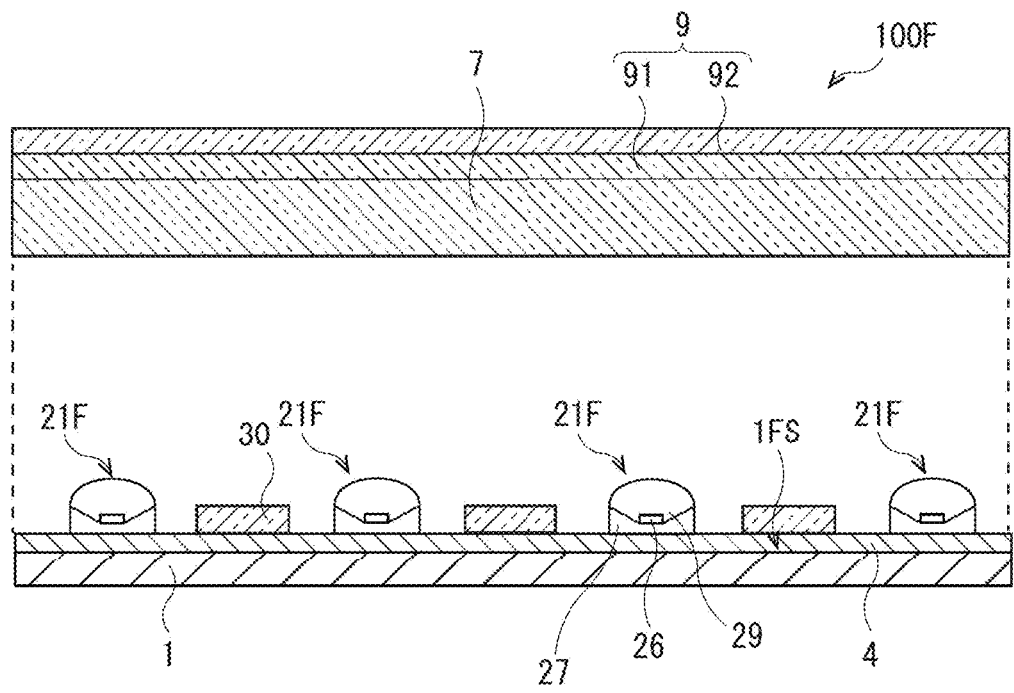

[ FIG. 21 ]
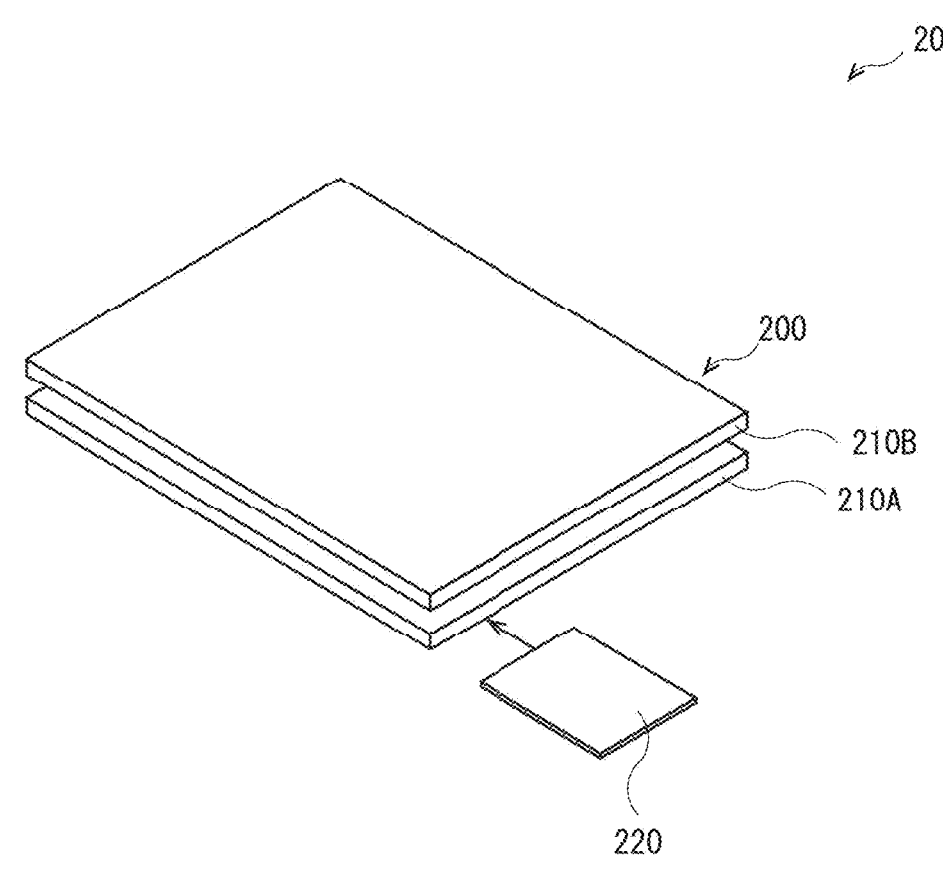

[ FIG. 22 ]
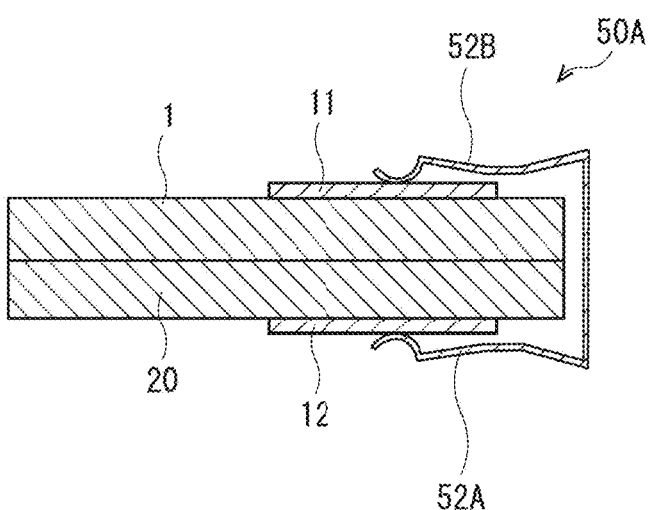

LIGHT-EMITTING DEVICE AND DISPLAY APPARATUS

CROSS REFERENCE TO PRIOR APPLICATION

This application is a National Stage Patent Application of PCT International Patent Application No. PCT/JP2023/009656 (filed on Mar. 13, 2023) under 35 U.S.C. § 371, which claims priority to Japanese Patent Application No. 2022-073701 (filed on Apr. 27, 2022), which are all hereby incorporated by reference in their entirety.

TECHNICAL FIELD

The present disclosure relates to a light-emitting device suitable for a surface light source, and a display apparatus that displays images using illumination light emitted by the light-emitting device.

BACKGROUND ART

Heretofore, an illumination device including an LED (Light Emitting Diode) as a light source has been used as a backlight of a liquid crystal display apparatus, for example (see, for example, PTL 1).

CITATION LIST

Patent Literature

PTL 1: International Publication No. WO2020/039721

SUMMARY OF THE INVENTION

Meanwhile, in recent years, there has been a demand for a light-emitting device that includes multiple light sources highly integrated and that makes it possible to achieve a higher-definition light-emission luminance distribution.

Therefore, a light-emitting device that has superior reliability while coping with high integration of light sources, and a display apparatus including the light-emitting device are desired.

A light-emitting device according to an embodiment of the present disclosure includes light source units, a relay member, and a pressure contact terminal. The light source units each include a light source board extending in a first direction, multiple light sources arranged in the first direction on the light source board, and a first terminal that is coupled to the multiple light sources. The relay member is opposed to the multiple light source units in a second direction intersecting with the first direction, and includes multiple second terminals that are each electrically coupled to a corresponding one of the first terminals of the multiple light source units. The pressure contact terminal is brought into pressure contact with at least one of the first terminal or the second terminal by mechanical biasing force and electrically couples the first terminal and the second terminal.

In the light-emitting device according to the embodiment of the present disclosure, the pressure contact terminal is used to electrically couple the first terminal and the second terminal by the mechanical biasing force. This makes it possible to stably maintain electrical coupling of the first terminal and the second terminal even if the first terminal and the second terminal are extremely small. This also enhances the degree of freedom in selecting the number of electrical contacts per unit region and the positions of electrical contacts. Further, this contributes to reduction in thickness of an entire configuration.

BRIEF DESCRIPTION OF DRAWINGS

FIG. 1A is a first perspective view of a light-emitting device according to a first embodiment of the present disclosure as viewed from a first direction.

FIG. 1B is a second perspective view of the light-emitting device illustrated in FIG. 1A as viewed from a second direction.

FIG. 2A is a first enlarged perspective view of a portion of the light-emitting device illustrated in FIG. 1A.

FIG. 2B is a second enlarged perspective view of a portion of the light-emitting device illustrated in FIG. 1B.

FIG. 3 is a plan view of a planar configuration of the light-emitting device illustrated in FIG. 1A.

FIG. 4 is a cross-sectional view of a cross-sectional configuration of a portion of the light-emitting device illustrated in FIG. 1A.

FIG. 5 is an enlarged cross-sectional view of a configuration example of a light source illustrated in FIG. 1A.

FIG. 6 is an enlarged cross-sectional view of a configuration example of a wavelength conversion sheet illustrated in FIG. 1A.

FIG. 7 is a plan view and a cross-sectional view of a configuration example of a light-emitting device according to a first modification example of the first embodiment.

FIG. 8 is an explanatory diagram for describing a method of assembling the light-emitting device illustrated in FIG. 7.

FIG. 9 is a plan view and a cross-sectional view of a configuration example of a light-emitting device according to a second modification example of the first embodiment.

FIG. 10 is an explanatory diagram for describing a method of assembling the light-emitting device illustrated in FIG. 9.

FIG. 11 is a perspective view of an external appearance of a display apparatus according to a second embodiment of the present disclosure.

FIG. 12 is an exploded perspective view of a body illustrated in FIG. 11.

FIG. 13 is an exploded perspective view of a panel module illustrated in FIG. 12.

FIG. 14 is a schematic plan view of a planar configuration example of the panel module illustrated in FIG. 12.

FIG. 15 is a cross-sectional view of a configuration example of a light-emitting device according to a first other modification example of the present disclosure.

FIG. 16 is a cross-sectional view of a configuration example of a light-emitting device according to a second other modification example of the present disclosure.

FIG. 17 is a cross-sectional view of a configuration example of a light-emitting device according to a third other modification example of the present disclosure.

FIG. 18 is a cross-sectional view of a configuration example of a light-emitting device according to a fourth other modification example of the present disclosure.

FIG. 19 is a cross-sectional view of a configuration example of a light-emitting device according to a fifth other modification example of the present disclosure.

FIG. 20 is a cross-sectional view of a configuration example of a light-emitting device according to a sixth other modification example of the present disclosure.

FIG. 21 is a cross-sectional view of a configuration example of a display apparatus according to a seventh other modification example of the present disclosure.

FIG. 22 is a cross-sectional view of a configuration example of a pressure contact terminal according to an eighth other modification example of the present disclosure.

MODES FOR CARRYING OUT THE INVENTION

Some embodiments of the present disclosure are described below in detail with reference to the drawings. It is to be noted that description is given in the following order.

1. First Embodiment (Light-emitting Device)
1.1 Configuration
1.2 Workings
1.3 Effects
2. Second Embodiment (Liquid Crystal Display Apparatus)
3. Other Modification Examples

1. First Embodiment

1.1 Configuration

FIGS. 1A and 1B are each a perspective view of a configuration example of a light-emitting device 100 according to a first embodiment of the present disclosure. FIGS. 1A and 1B illustrate the light-emitting device 100 viewed from exactly opposite directions to each other. FIGS. 2A and 2B are each an enlarged perspective view of a portion of the light-emitting device 100. FIGS. 2A and 2B illustrate the light-emitting device 100 viewed from exactly opposite directions to each other. FIG. 2A illustrates the light-emitting device 100 viewed from a direction corresponding to FIG. 1A, and FIG. 2B illustrates the light-emitting device 100 viewed from a direction corresponding to FIG. 1B. More specifically, FIG. 2A illustrates an intersection XP where a light source unit 10 (to be described later) extending in an X-axis direction crosses over a relay board 20 (to be described later) extending in a Y-axis direction. Note that FIG. 2A illustrates the light source unit 10 that is partially cut away so as to allow a front surface 20FS (to be described later) of the relay board 20 to be visually recognized. In addition, FIG. 2B illustrates an intersection XP where the relay board 20 extending in the Y-axis direction crosses over the light source unit 10 extending in the X-axis direction. Note that FIG. 2B illustrates the relay board 20 that is partially cut away so as to allow a back surface 1BS (to be described later) of a light source board 1 of the light source unit 10 to be visually recognized. FIG. 3 is a plan view of a planar configuration example of the light-emitting device 100. Further, FIG. 4 is an enlarged cross-sectional view of a cross-sectional configuration example of a portion of the light-emitting device 100. It is to be noted that FIG. 4 illustrates a cross-section taken along an arrow direction along a IV-IV cutting line indicated in FIG. 3. The light-emitting device 100 is suitable for a surface light source and is used, for example, as a direct backlight mounted in a liquid crystal display apparatus.

The light-emitting device 100 includes, for example, multiple light source units 10, the relay board 20, a flexible film 30, a pressure contact terminal 50, and a back chassis 60. The multiple light source units 10 each extend in the X-axis direction and are arranged to be aligned in a Y-axis direction. In contrast, the relay board 20 extends, for example, in the Y-axis direction and is mechanically joined to each of the multiple light source units 10. The relay board 20 is also electrically coupled to each of the multiple light source units 10.

In the present embodiment, the X-axis direction corresponds to a longitudinal direction of the light source unit 10, the Y-axis direction corresponds to a lateral direction of the light source unit 10, and a Z-axis direction corresponds to a thickness direction of the light source unit 10. The X-axis direction, the Y-axis direction, and the Z-axis direction are perpendicular to each other. The Z-axis direction also corresponds to a direction in which the light source unit 10 and the relay board 20 are opposed to each other.

As illustrated in FIG. 1A, each light source unit 10 includes the light source board 1 and multiple light sources 2. As illustrated in FIG. 4, the light source board 1 has a front surface 1FS and the back surface 1BS opposite to the front surface 1FS in the thickness direction (the Z-axis direction). The multiple light sources 2 are mounted on wires 4 provided on side of the front surface 1FS of the light source board 1. The multiple light sources 2 are aligned at predetermined intervals in, for example, one row in the X-axis direction, which is the longitudinal direction of the light source board 1. Further, the flexible film 30 extends along an XY plane and is provided on side of the front surface 1FS of the light source board 1 so as to entirely cover the multiple light source units 10. The multiple light source units 10 are preferably fixed to the flexible film 30 by, for example, bonding. The relay board 20 is provided on side of the back surface 1BS of the light source board 1. In addition, the back chassis 60 is a supporting body that supports each of the light source units 10 and the relay board 20, and is provided to be opposed to the back surface 1BS of the light source board 1. It is to be noted that FIG. 1A illustrates a simplified shape of the back chassis 60. In addition, in FIGS. 1B and 3, in order to secure visibility, illustration of the back chassis 60 is omitted.

As illustrated in FIG. 3, the light-emitting device 100 includes driving elements 40. The driving elements 40 may be provided, for example, on the light source board 1 of each light source unit 10, or may be provided on the relay board 20. As illustrated in FIG. 4, the light-emitting device 100 may further include spacers 6, a diffusion sheet 7, a wavelength conversion sheet 8, and an optical sheet group 9.
(Light Source Unit 10)

As illustrated in FIGS. 1A, 1B, and 3, the multiple light source units 10 are preferably aligned spaced apart from each other in the Y-axis direction, for example. In particular, as illustrated in FIG. 3, a width W1, which is a dimension of each of the light source unit 10 in the Y-axis direction, is preferably narrower than an interval W2 between adjacent ones of the light source units 10. A reason for this is that it is possible to reduce constituent materials of the light source board 1 and the like, achieving weight reduction. It is to be noted that, in the examples illustrated in FIGS. 1A, 1B, and 3, eight light source units 10 are coupled to one relay board 20; however, the present disclosure is not limited thereto. Seven or less light source units 10 may be coupled to one relay board 20, or nine or more light source units 10 may be coupled to one relay board 20.

As illustrated in FIG. 4, the light source unit 10 includes the light source board 1, the multiple light sources 2, the wires 4, an insulating layer 4Z, and a resin layer 5. The light source board 1 is, for example, a resin-made plate-like member having an electrically insulating property. Alternatively, the light source board 1 may be a film-like member having flexibility. As the light source board 1, it is possible to use a resin-made film including, for example, PI (polyimide), PET (polyethylene terephthalate), PC (polycarbonate), PEN (polyethylene naphthalate), PEI (polyetherimide), LCP (liquid crystal polymer), or fluororesin. Alternatively, as the light source board 1, an insulating resin layer includ-
ing, for example, polyimide or an epoxy-based resin and
formed on a surface of a metal-base substrate including, for
example, aluminum (Al) may be used. Still alternatively, as
the light source board 1, a film base material including a
glass-containing resin, such as a glass epoxy resin typified
by FR4 or a glass composite resin typified by CEM3, may
be used. The multiple wires 4 provided in the insulating
layer 4Z and the multiple light sources 2 are mounted on side
of the front surface 1FS of the light source board 1. Further,
multiple first terminals 11 are formed on the back surface
1BS of the light source board 1. The multiple first terminals
11 are electrically coupled to the wires 4 through, for
example, a via 10V. As illustrated in FIG. 2B, the multiple
first terminals 11 each extend, for example, in the X-axis
direction, and are aligned adjacent to each other in the Y-axis
direction. In addition, in the light-emitting device 100
according to the present embodiment, the pressure contact
terminal 50 is attached to each of the multiple first terminals
11.

(Light Source 2 and Wire 4)

The multiple light sources 2 are provided on side of the
front surface 1FS of the light source board 1. As described
above, the multiple light sources 2 are arranged at the
predetermined intervals in one row in the X-axis direction,
which is an extending direction of the light source board 1,
as illustrated in FIG. 3, for example. It is to be noted that the
interval between the multiple light sources 2 is not limited
to a constant interval, and may be set to any interval as
desired. Alternatively, multiple rows of the light sources 2 may be provided on one light source board 1 such that the
rows of the multiple light sources 2 aligned in the X-axis
direction are adjacent to each other in the Y-axis direction.
On the front surface 1FS of the light source board 1, the
multiple wires 4 having predetermined pattern shapes are
formed so that light-emission control is enabled to be
independently performed for each light source 2 or for every
two or more light sources 2. The multiple wires 4 enable
local light-emission control (local dimming) of the multiple
light sources 2 to be performed. In the light-emitting device
100, the driving elements 40 control light-emission strength
and lighting timing for each unit region A (AL, AC, and AR)
indicated by a broken line in FIG. 3, for example. The
driving elements 40 are driving ICs that drive the respective
light sources 2, that is, driving ICs that turn on and turn off
the light sources 2. The driving elements 40 are preferably
provided on at least one of the relay board 20 or the light
source board 1. In the configuration example of FIG. 3, one
driving element 40L and one driving element 40R are
provided on the light source board 1, and a driving element
40C is provided on the relay board 20. In the configuration
example of FIG. 3, the light sources 2 provided in the unit
region AL are coupled to the driving element 40L by the
wires 4, the light sources 2 provided in the unit region AC
are coupled to the driving element 40C by the wires 4, and the light sources 2 provided in the unit region AR are
coupled to the driving element 40R by the wires 4. The
driving element 40L drives, for example, three light sources
2 provided in the unit region AL among the multiple light
sources 2 provided on the light source board 1. The driving
element 40C drives, for example, three light sources 2
provided in the unit region AC among the multiple light
sources 2 provided on the light source board 1. The driving
element 40R drives, for example, three light sources 2
provided in the unit region AR among the multiple light
sources 2 provided on the light source board 1. It is to be
noted that, in the example illustrated in FIG. 3, three light sources 2 are arranged in one unit region A; however, the
present disclosure is not limited thereto. The number of light
sources 2 included in one unit region A may be one or two,
or may be four or more.

The wire 4 is formed by bonding a copper foil to the light
source board 1 and then patterning the copper foil by a
photolithography method, for example. Alternatively, the
wire 4 may be formed by forming a metal film on the light
source board 1 by plating or a vacuum film forming tech-
nology, and then patterning the metal film by a photolithog-
raphy method. Still alternatively, the wire 4 may be formed
by a printing method such as screen printing or an inkjet
method. Examples of a constituent material of the wire 4
include copper (Cu), aluminum (Al), silver (Ag), and an
alloy thereof.

(Resin Layer 5)

The resin layer 5 is, for example, a white resist layer. The
resin layer 5 has a relatively high reflectance with respect to
light from the light source 2 and light with a wavelength
converted by the wavelength conversion sheet 8. Examples
of the white resist include inorganic materials such as
titanium oxide ($TiO_2$) fine particles and barium sulfate
($BaSO_4$) fine particles, and organic materials such as porous
acrylic resin fine particles having numerous pores for light-
scattering and polycarbonate resin fine particles. As a con-
stituent material of the resin layer 5, an epoxy-based resin
may be also used. Further, the resin layer 5 may include a
resin that contains fine particles of an inorganic material
such as titanium oxide ($TiO_2$) fine particles and barium
sulfate ($BaSO_4$) fine particles. It is to be noted that the
flexible film 30 is bonded to a region of a front surface of the
resin layer 5 other than a region where the light sources 2 are
provided.

(Details of Light Source 2)

FIG. 5 is an enlarged cross-sectional view of a configu-
ration example of the light source 2 illustrated in FIG. 1A,
for example. It is to be noted that FIG. 5 also illustrates the
flexible film 30. As illustrated in FIG. 5, the light source 2
is what is called a direct-potting type light source, and
includes a light-emitting element 21 and a sealing lens 22.
The light-emitting element 21 includes, for example, a
semiconductor layer 23 including a light-emitting body, and
a reflective layer 25 disposed so as to be opposed to the
semiconductor layer 23 in the Z-axis direction with a
transparent layer 24 interposed therebetween.

The transparent layer 24 includes, for example, sapphire
or silicon carbide (SIC). The semiconductor layer 23 is
formed by, for example, sequentially stacking an n-type
semiconductor layer, an active layer, and a p-type semicon-
ductor layer from side of the transparent layer 24. The n-type
semiconductor layer includes, for example, an n-type nitride
semiconductor (e.g., n-type GaN). The active layer includes,
for example, a nitride semiconductor (e.g., n-type GaN)
having a quantum-well structure. The p-type semiconductor
layer includes, for example, a p-type nitride semiconductor
(e.g., p-type GaN). The semiconductor layer 23 includes, for
example, a blue LED (Light Emitting Diode) that emits blue
light (having a wavelength of 440 nm to 460 nm, for
example). The reflective layer 25 is provided on a surface of
the transparent layer 24 opposite to the semiconductor layer
23. The reflective layer 25 includes a material having a high
reflectance. Specifically, the reflective layer 25 includes a
silver vapor-deposited film, an aluminum vapor-deposited
film, a multilayer reflective film, or the like. Examples of the
multilayer reflective film include a DBR (Distributed Bragg
Reflector).

As illustrated in FIG. 5, in the light-emitting element 21, light LB emitted from the active layer of the semiconductor layer 23 is reflected by the reflective layer 25, and then enters the sealing lens 22 through an end face 24T of the transparent layer 24. The light LB having entered the sealing lens 22 passes through the sealing lens 22 and is outputted to the surroundings. It is to be noted that the light LB undergoes an optical action when passing through the sealing lens 22.

The sealing lens 22 is an optical member including a transparent resin such as silicone or acrylic, for example. The sealing lens 22 entirely covers the light-emitting element 21 and is configured to seal the light-emitting element 21. The sealing lens 22 has a refractive index between a refractive index of the semiconductor layer 23 of the light-emitting element 21 and a refractive index of air. The sealing lens 22 protects the light-emitting element 21 and improves extraction efficiency of light emitted from the light-emitting element 21. An external shape of the sealing lens 22 is not particularly limited as long as having an optical action as a lens for extracting the light LB emitted from the light-emitting element 21. For example, the external shape of the sealing lens 22 is not limited to a shape including a spherical surface, and may be a shape including an aspherical surface. Further, the sealing lens 22 may control a light distribution direction of the light LB emitted from the light-emitting element 21.

Since the light source 2 has a direct-potting type configuration, it is easy to shape the sealing lens 22 into a dome shape having an aspect ratio of 0.2 or greater and 1 or less. In particular, a luminance uniform characteristic such as luminance unevenness becomes good when the sealing lens 22 is shaped into a dome shape having an aspect ratio within a range from 0.4 to 0.6. Here, the aspect ratio is a ratio h/r between a height h and a radius r of the dome lens shape. When the aspect ratio is 1, the sealing lens 22 has a hemispherical shape.

(Wavelength Conversion Sheet 8)

The wavelength conversion sheet 8 is disposed so as to be opposed to the multiple light sources 2. FIG. 6 is an enlarged cross-sectional view of a portion of the wavelength conversion sheet 8 illustrated in FIG. 4. As illustrated in FIG. 6, the wavelength conversion sheet 8 includes, for example, a wavelength conversion substance 81 in a particulate form. The wavelength conversion substance 81 includes, for example, a phosphor (a fluorescent material) such as a fluorescent pigment or a fluorescent dye, or a quantum dot. The wavelength conversion substance 81 is excited by light from the light source 2, converts the light from the light source 2 into light having a different wavelength from an original wavelength according to a principle of fluorescence emission, for example, and outputs the light. It is to be noted that, in FIG. 6, the wavelength conversion substance 81 is illustrated in a particulate form for the sake of simplicity; however, in the present disclosure, the wavelength conversion substance 81 is not limited to a substance formed in a particulate form.

The wavelength conversion substance 81 included in the wavelength conversion sheet 8 absorbs blue light emitted from the light source 2, and converts a part of the blue light into red light (having a wavelength of 620 nm to 750 nm, for example) or green light (having a wavelength of 495 nm to 570 nm, for example). In this case, the light from the light source 2 passes through the wavelength conversion sheet 8, whereby red light, green light, and blue light are combined to generate white light. Alternatively, the wavelength conversion substance 81 included in the wavelength conversion sheet 8 may absorb blue light and convert a part of the blue light into yellow light. In this case, the light from the light source 2 passes through the wavelength conversion sheet 8, whereby yellow light and blue light are combined to generate white light.

It is preferable that the wavelength conversion substance 81 included in the wavelength conversion sheet 8 include a quantum dot. The quantum dot is a particle with a major diameter of 1 nm to 100 nm, and has a discrete energy level. Since the energy state of the quantum dot depends on its size, it is possible to freely select an emission wavelength by changing the size. Further, light emitted from the quantum dot has a narrow spectral width. By combining light having such a steep peak, a color gamut is enlarged. Therefore, using the quantum dot as the wavelength conversion substance makes it possible to easily enlarge the color gamut. Further, the quantum dot has high responsiveness, which makes it possible to efficiently use the light of the light source 2. In addition, the quantum dot also has high stability. The quantum dot is, for example, a compound of a Group 12 element and a Group 16 element, a compound of a Group 13 element and a Group 16 element, or a compound of a Group 14 element and a Group 16 element. Examples of the quantum dots include CdSe, CdTe, ZnS, CdS, PbS, PbSe, and CdHgTe. In addition, there is also a demand for a Cd-free quantum dot due to environmental regulations such as RoHS regulations. Examples of a core material include: InP-based material; a CsPbBr3-based material such as perovskite; Zn (Te, Se); and indium-silver sulfide which is one of ternary systems of a I-III-VI group.

(Diffusion Sheet 7)

The diffusion sheet 7 is an optical member disposed between the wavelength conversion sheet 8 and the multiple light sources 2. The diffusion sheet 7 uniformizes an angular distribution of incident light. The diffusion sheet 7 may include one diffusion plate or one diffusion sheet, or may include two or more diffusion plates or two or more diffusion sheets. Further, the diffusion sheet 7 may be a plate-shaped optical member having a constant thickness and a constant hardness.

(Spacer 6)

The spacer 6 is a member that maintains an optical distance between the light source 2 and the diffusion sheet 7.

(Optical Sheet Group 9)

The optical sheet group 9 is an optical member disposed on side of a light-emitting surface of the wavelength conversion sheet 8, i.e., on side opposite to the diffusion sheet 7 when viewed from the wavelength conversion sheet 8. The optical sheet group 9 includes, for example, a sheet or a film that improves luminance. In the example illustrated in FIG. 4, the optical sheet group 9 is formed by stacking an optical sheet 91 and an optical sheet 92 in order on the wavelength conversion sheet 8. The optical sheet 91 and the optical sheet 92 may be joined to each other and integrated. The optical sheet 91 is, for example, a prism sheet. The optical sheet 92 is, for example, a reflective polarizing film such as a DBEF (Dual Brightness Enhancement Film). It is to be noted that the number of optical sheets included in the optical sheet group 9, the type and the stack order of the multiple optical sheets included in the optical sheet group 9, and the like may be selected as desired.

(Flexible Film 30)

The flexible film 30 is selectively provided on the resin layer 5. More specifically, the flexible film 30 is provided in a region of the front surface 1FS other than the region where the multiple light sources 2 are provided. The flexible film 30 is provided with openings 30K in regions overlapping with the multiple light sources 2 in the Z-axis direction. The opening 30K is a punched hole in which the light source 2 is provided. In the region where the opening 30K is formed, the resin layer 5 is exposed, and the exposed resin layer 5 is covered with the sealing lens 22 of the light source 2. The flexible film 30 is joined to a front surface of the resin layer 5 extending on the XY plane. Specifically, the flexible film 30 is fixed to the front surface of the resin layer 50 by an adhesive, a double-faced tape, screw fastening, or the like. Alternatively, the flexible film 30 may be sandwiched between the spacer 6 and the resin layer 5. The flexible film 30 is, for example, a reflective sheet, and has a high reflectance with respect to the light LB from the light source 2 and light LY with the wavelength converted by the wavelength conversion sheet 8. The flexible film 30 may include titanium oxide or Ag (silver) as a material having a high reflectance. Specifically, the flexible film 30 is, for example, a white resist layer. Examples of the white resist include inorganic materials such as titanium oxide ($TiO_2$) fine particles and barium sulfate ($BaSO_4$) fine particles, and organic materials such as porous acrylic resin fine particles having numerous pores for light-scattering and polycarbonate resin fine particles. As a constituent material of the flexible film 30, an epoxy-based resin may be also used. Further, the flexible film 30 may include a resin that contains fine particles of an inorganic material such as titanium oxide ($TiO_2$) fine particles and barium sulfate ($BaSO_4$) fine particles.

As described above, the flexible film 30 is a reflective sheet. Accordingly, return light reflected by the wavelength conversion sheet 8 or the optical sheet group 9 of the light LB and the light LY is reflected by the flexible film 30 and is used as recycled light to generate white light. This makes it possible to improve the entire luminance of the light-emitting device 100.

(Relay Board 20)

The relay board 20 is a member that electrically and mechanically couples the multiple light source units 10 and relays the multiple light source units 10 with a power supply circuit, a drive circuit, and the like. The relay board 20 includes, for example, a plate-like member, like the light source board 1. Alternatively, the relay board 20 may include, for example, a film member having flexibility. A material similar to the material of the light source board 1 may be used as a constituent material of the relay board 20. That is, as the relay board 20, it is possible to use a resin-made film including, for example, PI (polyimide), PET (polyethylene terephthalate), PC (polycarbonate), PEN (polyethylene naphthalate), PEI (polyetherimide), LCP (liquid crystal polymer), or fluororesin. Alternatively, an insulating resin layer including, for example, polyimide or an epoxy-based resin and formed on a surface of a metal-base substrate including, for example, aluminum (Al) may be used as the relay board 20. Still alternatively, a film-base material including a glass-containing resin, such as a glass epoxy resin typified by FR4 or a glass composite resin typified by CEM3, may be used as the relay board 20. Multiple second terminals 12 are formed on a front surface 20FS, i.e., a surface opposed to the light source board 1, of the relay board 20. Further, multiple wires 53 may be formed on a back surface 20BS, i.e., a surface opposed to the light source board 1, of the relay board 20. The second terminal 12 is electrically coupled to the wire 53 through, for example, a via 20V. It is to be noted that the multiple second terminals 12 each extend, for example, in the X-axis direction, and are aligned adjacent to each other in the Y-axis direction, like the multiple first terminals 11. In addition, in the light-emitting device 100 according to the present embodiment, as will be described later, the pressure contact terminal 50 attached to each of the multiple first terminals 11 is brought into pressure contact with a corresponding one of the multiple second terminals 12.

As illustrated in FIGS. 2A and 2B, the multiple first terminals 11 and the multiple second terminals 12 are disposed so as to be opposed to each other in the Z-axis direction at the intersection XP of each light source unit 10 and the relay board 20. As illustrated in FIG. 4, the multiple second terminals 12 of the relay board 20 are each electrically coupled to a corresponding one of the multiple first terminals 11 of each light source unit 10 through a corresponding one of the multiple pressure contact terminals 50.

(Pressure Contact Terminal 50)

The pressure contact terminal 50 is provided so as to be interposed between the back surface 1BS of the light source board 1 and the front surface 20FS of the relay board 20 in the Z-axis direction at each of the intersections XP of the multiple light source units 10 and the relay board 20 (FIGS. 2B and 4). The pressure contact terminal 50 is an electrically conductive member that is brought into pressure contact with at least one of the first terminal 11 or the second terminal 12 by mechanical biasing force and electrically couples the first terminal 11 and the second terminal 12. The pressure contact terminal 50 includes, for example, a base 51 and an elastic section 52. The base 51 is fixed to the first terminal 11. The elastic section 52 is attached to the base 51, and exhibits elasticity. The elastic section 52 includes, for example, a leaf spring, and is configured to bend in the Z-axis direction. In the example illustrated in FIG. 4, the elastic section 52 extends in the X-axis direction, and a distal end. i.e., an end opposite to the base 51, of the elastic section 52 serves as a pressure contact section 52T that is to be in pressure contact with the second terminal 12. The pressure contact section 52T is pressed against the second terminal 12 by elasticity of the elastic section 52. That is, the pressure contact terminal 50 applies biasing force F50 in a −Z direction to the second terminal 12. The pressure contact terminal 50 includes, for example, a metal material such as copper.

(Back Chassis 60)

The back chassis 60 is a supporting body that supports the multiple light source units 10 and the relay board 20. The back chassis 60 has a front surface 60FS and a depression 60U. The front surface 60FS is opposed to the back surface 1BS of the light source board 1 of the light source unit 10. The depression 60U is recessed away from the back surface 1BS. The relay board 20 is contained in the depression 60U. Each of the light source units 10 is bonded and fixed to the back chassis 60 with, for example, an insulating adhesive layer Z1 provided between the back surface 1BS and the front surface 60FS of the back chassis 60. It is to be noted that each of the light source units 10 may be fixed to the back chassis 60 by screw fastening using a screw instead of being bonded and fixed with use of the insulating adhesive layer Z1. Further, fitting sections may be provided on both of the back surface 1BS and the front surface 60FS, and each of the light source units 10 may be fixed to the back chassis 60 by fitting the fitting sections with each other. Likewise, the relay board 20 is bonded and fixed to the back chassis 60 with, for example, an insulating adhesive layer Z2 provided between the back surface 20BS and the depression 60U of the back chassis 60. In this case also, the relay board 20 may be fixed to the back chassis 60 by screw fastening using a screw instead of being bonded and fixed with use of the insulating adhesive layer Z2. Further, fitting sections may be provided on both of the back surface 20BS and the depression 60U, and each of the light source units 10 may be fixed to the back chassis 60 by fitting the fitting sections with each other.

1.2 Workings

In the light-emitting device 100 according to the present embodiment, as illustrated in FIG. 4, a part of the blue light LB emitted from the light source 2 is converted into the light LY with a wavelength converted by (emitted from) the wavelength conversion substance included in the wavelength conversion sheet 8. The light LY with the converted wavelength is, for example, red light and green light, or yellow light. The light LY with the converted wavelength is uniformly reflected and outputted from the wavelength conversion sheet 8 in all directions on average. The blue light LB not absorbed by the wavelength conversion substance 81 of the blue light LB emitted from the light source 2 is also uniformly outputted from the wavelength conversion sheet 8 in all directions on average. The blue light LB not absorbed by the wavelength conversion substance 81 (FIG. 6) of the blue light LB emitted from the light source 2 is outputted as it is from the wavelength conversion sheet 8. Light directed forward of the blue light LB with a wavelength not converted and light directed forward of the light LY with a converted wavelength are combined to generate white light, which is outputted forward (outside the light source device).

In the light-emitting device 100 according to the present embodiment, the multiple light source units each including the multiple light sources arranged thereon are coupled to one relay board 20. It is therefore possible to finely adjust the arrangement positions for each of the multiple light source units 10, facilitating optimization of the arrangement position of each light source 2. This is also advantageous for reducing the weight of the light-emitting device 100. That is, by coupling the multiple light source units 10 to one relay board 20, it is possible to reduce the amount of a material used for the light source board 1 and to reduce the weight and cost of the light-emitting device 100 including the multiple light sources 2, as compared with a configuration in which the multiple light sources are arranged on one board-shaped substrate, for example. Therefore, according to the light-emitting device 100, it is possible to achieve a high-definition light-emission luminance distribution while achieving weight reduction and cost reduction.

In the light-emitting device 100 according to the present embodiment, the multiple light source units 10 are provided so as to be aligned spaced apart from each other in the Y-axis direction. It is therefore possible to reduce the amount of the material used for the light source board 1 and to reduce the weight and cost of the light-emitting device 100 including the multiple light sources 2, as compared with the configuration in which the multiple light sources 2 are arranged on one board-shaped light source board.

Further, in the light-emitting device 100 according to the present embodiment, the width W1 of the light source unit 10 in the Y-axis direction is narrower than the interval W2 between adjacent ones in the Y-axis direction of the multiple light source units 10. Therefore, when a predetermined number of the light sources 2 are arranged as a whole of the light-emitting device 100, it is possible to reduce the amount of the material used for the light source board 1 and to further reduce the weight and cost of the light-emitting device 100, as compared with a case where the width W1 is equal to or larger than the interval W2, for example.

Further, in the light-emitting device 100 according to the present embodiment, the multiple light sources 2 are aligned in one row in the X-axis direction on the light source board 1. Therefore, when a predetermined number of the light sources 2 are arranged in the light-emitting device 100 as a whole, it is possible to reduce the amount of the material used for the light source board 1 and to further reduce the weight and cost, as compared with a case where the multiple light sources 2 are aligned in multiple rows, for example.

Further, in the light-emitting device 100, the multiple light source units 10 and the relay board 20 perform electrical coupling of the first terminals 11 and the second terminals 12 by mechanical biasing force of the pressure contact terminals 50. It is therefore possible to simplify the coupling portions between the multiple light source units 10 and the relay board 20, and to reduce the size, thickness, and weight of the coupling portions, as compared with a case of joining with connectors, for example. Therefore, it is possible to reduce the size of each light source unit 10, and to increase the number of the light sources 2 per unit region, as compared with a case of using connectors. That is, it is possible to achieve high integration of the multiple light sources 2.

Further, in the light-emitting device 100, the pressure contact terminals 50 are used; therefore, the ease of manufacturing is improved, as compared with the case of using connectors. That is, in connector coupling, highly precise alignment is demanded. However, in a case of using the pressure contact terminal 50, the pressure contact terminal 50 and each of the first terminal 11 and the second terminal 12 are electrically coupled as long as portions thereof are in contact with each other. This eliminates the need for highly precise alignment demanded in connector coupling. In addition, in the light-emitting device 100, the light source units 10, on which the pressure contact terminals 50 are attached to the first terminals 11, are bonded and fixed to the back chassis 60, in which the relay board 20 is contained in the depression 60U, with the insulating adhesive layer Z1, which naturally causes the pressure contact terminals 50 to be brought into pressure contact with the second terminals 12. Accordingly, upon manufacturing the light-emitting device 100, it is possible to collectively perform a mechanical coupling operation of fixing the light source units 10 to the relay board 20, and an operation of electrically coupling the light source units 10 and the relay board 20.

Further, in the light-emitting device 100, the pressure contact terminals 50 are used; therefore, the degree of freedom in designing the number and arrangement positions of electrical contacts is enhanced, as compared with the case of using connectors, for example.

In addition, in the light-emitting device 100, electrical coupling is secured by the pressure contact terminals 50 at multiple positions in each predetermined region at each of the intersections XP of the multiple light source units 10 and the relay board 20. Electrically coupling each of the multiple light source units 10 and the relay board 20 at multiple positions in such a manner makes it possible to secure multiple channels such as a signal transmission path and a power supply path between each of the light source units 10 and the relay board 20. Accordingly, the light-emitting device 100 is allowed to have more functions.

In addition, in the light-emitting device 100, the light source board 1 has flexibility, or both of the light source board 1 and the relay board 20 have flexibility. Accordingly, it is possible to suitably apply the light-emitting device 100 to a display device having a curved screen, for example.

Further, in the light-emitting device 100, the multiple light source units 10 are fixed and integrated by one flexible film 30. This makes it easy to handle a semi-finished product in the course of the manufacturing process, for example. For instance, it is possible to perform a batch operation of joining the multiple light source units 10 to the relay board 20, which enhances ease of manufacturing.

In addition, in the light-emitting device 100, the flexible film 30 is joined to the surface of the resin layer 5 of the light source unit 10, which is the surface extending on the XY plane. Therefore, the multiple light source units 10 are held more stably with respect to the flexible film 30.

Further, in the light-emitting device 100, the flexible film 30 has the openings 30K in the regions overlapping with the light sources 2 in the Z-axis direction. Therefore, even when the flexible film 30 is disposed on light-emission side of the light source 2, it is possible to join the flexible film 30 to the multiple light source units 10 while avoiding the regions where the light sources 2 are present. Therefore, it is possible to avoid inhibiting the progress of emitted light by the flexible film 30.

Further, in the light-emitting device 100, the driving elements that drive the multiple light sources 2 are provided on at least one of the relay board 20 or the light source board 1. It is therefore possible to drive the multiple light sources 2 at a higher speed than when the driving elements 40 are provided outside the light-emitting device 100. In particular, since the driving elements 40 are provided on the light source board 1 and drive some of the light sources 2 in the vicinity of the driving elements 40 among the multiple light sources 2 provided on the light source board 1, it is possible to further enhance responsiveness of the light sources 2.

1.3 Effects

As described above, according to the light-emitting device 100 according to the present embodiment, it is possible to arrange the multiple light sources at a higher density and to achieve excellent light emission performance. In addition, it is also possible to achieve weight reduction. Further, it is also possible to improve the ease of manufacturing.

1.4 Modification Examples of First Embodiment

First Modification Example

FIG. 7 is a plan view and a cross-sectional view of a configuration example of a light-emitting device 100-1 according to a first modification example of the first embodiment, where (A) of FIG. 7 is a plan view of one light source unit 10 and one relay board 20 attached to the back chassis 60, and (B) of FIG. 7 is a cross-sectional view of a cross section taken along an arrow direction along a VII-VII cutting line indicated in (A) of FIG. 7. Note that FIG. 7 illustrates the light source board 1 only of the light source unit 10, and does not illustrate the light sources 2 and the like.

In the light-emitting device 100 according to the first embodiment described above, the light source units 10 are attached to the back chassis 60 with the insulating adhesive layer Z1; however, the present disclosure is not limited thereto. In the light-emitting device 100-1 according to the first modification example illustrated in FIG. 7, the light source board 1 of each of the light source units 10 has an opening 1K and a depression 1U. The opening 1K is a specific example corresponding to a "first engagement section" of the present disclosure. It is to be noted that the opening 1K illustrated in FIG. 7 is an example, and is not limited in shape and size to the opening 1K illustrated in FIG. 7. For example, a depression or a hook may be provided instead of the opening 1K. In addition, the depression 1U is a specific example corresponding to a "first fitting section" of the present disclosure. It is to be noted that the depression 1U illustrated in FIG. 7 is an example, and is not limited in shape and size to the depression 1U illustrated in FIG. 7. For example, a protrusion may be provided instead of the depression 1U.

Further, in the light-emitting device 100-1, the back chassis 60 has a hook 60K and a protrusion 60T. The hook 60K is a specific example corresponding to a "second engagement section" of the present disclosure. It is to be noted that the hook 60K illustrated in FIG. 7 is an example, and is not limited in shape and size to the hook 60K illustrated in FIG. 7. In addition, the protrusion 60T is a specific example corresponding to a "second fitting section" of the present disclosure. It is to be noted that the protrusion 60T illustrated in FIG. 7 is an example, and is not limited in shape and size to the protrusion 60T illustrated in FIG. 7. For example, a depression may be provided instead of the protrusion 60T.

As illustrated in FIG. 7, in the light-emitting device 100-1, the hook 60K is engaged with the opening 1K, and the protrusion 60T is fit into the depression 1U at a position where the hook 60K is engaged with the opening 1K. By doing so, the light source board 1 of the light source unit 10 is fixed to the back chassis 60.

FIG. 8 is an explanatory diagram for describing a method of assembling the light-emitting device 100-1 illustrated in FIG. 7. As illustrated in (A) of FIG. 8, the light source unit 10 is aligned with the back chassis 60 on the XY plane so as to be located at a position where the opening 1K and the hook 60K overlap with each other in the Z-axis direction. Thereafter, the light source unit 10 is brought closer to the back chassis 60 from above in the −Z direction to insert the hook 60K into the opening 1K. As illustrated in (B) of FIG. 8, the light source unit 10 is slid in a −X direction with respect to the back chassis 60 as indicated by an arrow. By doing so, as illustrated in (C) of FIG. 8, the depression 1U and the protrusion 60T are fit with each other at a position where the opening 1K and the hook 60K is engaged with each other. That is, the back chassis 60 and the light source unit 10 relatively move in the −X direction as a third direction to thereby engage the opening 1K as the first engagement section and the hook 60K as the second engagement section with each other. As a result, the light source board 1 of the light source unit 10 is fixed to the back chassis 60.

Second Modification Example

FIG. 9 is a plan view and a cross-sectional view of a configuration example of a light-emitting device 100-2 according to a second modification example of the first embodiment, where (A) of FIG. 9 is a plan view of the light source unit 10 and the relay board 20 attached to the back chassis 60, and (B) of FIG. 9 is a cross-sectional view of a cross section taken along an arrow direction along a IX-IX cutting line indicated in (A) of FIG. 9. Note that FIG. 9 illustrates the light source board 1 only of the light source unit 10, and does not illustrate the light sources 2 and the like.

In the light-emitting device 100-2 according to the second modification example illustrated in FIG. 9, the light source board 1 of each of the light source units 10 is fixed to the relay board 20. In the light-emitting device 100-2, the light source board 1 of each of the light source units 10 has through holes 1H, and the relay board 20 includes multiple pins 20P. Here, the multiple pins 20P are each inserted into a corresponding one of multiple through holes 1H, and are engaged with the multiple through holes 1H. The through hole 1H is a specific example of a "third engagement section" of the present disclosure. It is to be noted that the through hole 1H illustrated in FIG. 9 is an example, and is not limited in shape and size to the through hole 1H illustrated in FIG. 9. In addition, the pin 20P is a specific example of a "fourth engagement section" of the present disclosure. It is to be noted that the pin 20P illustrated in FIG. 9 is an example, and is not limited in shape and size to the pin 20P illustrated in FIG. 9.

FIG. 10 is an enlarged cross-sectional view of the pin 20P and its vicinity. As illustrated in FIG. 10, the pin 20P includes two tips 20T1 and 20T2 divided in the X-axis direction, and supporting bodies 20S1 and 20S2 that support the tips 20T1 and 20T2. The pin 20P is configured so as to cause that the tip 20T1 and the tip 20T2 to come into contact with each other or be spaced apart from each other by bending the supporting bodies 20S1 and 20S2. (A) of FIG. 10 illustrates a state in which the tips 20T1 and 20T2 of the pin 20P are inserted into the though hole 1H of the light source board 1 in the course of fixing the light source board 1 to the relay board 20 with the pin 20P. In the state in (A) of FIG. 10, the tip 20T1 and the tip 20T2 are in contact with each other. In contrast, (B) of FIG. 10 illustrates a state in which the light source board 1 is locked by the pin 20P, and in this state, the tip 20T1 and the tip 20T2 are spaced apart from each other. As illustrated in (B) of FIG. 10, the tip 20T1 and the tip 20T2 that have passed through the through hole 1H are separated away from each other in the X-axis direction to thereby come into contact with an inner edge of the through hole 1H. Accordingly, the light source board 1 is locked by the pin 20P.

2. Second Embodiment

2.1 Configuration

FIG. 11 illustrates an external appearance of a display apparatus 101 according to a second embodiment of the present technology. The display apparatus 101 includes the light-emitting device 100, and is used as a flat-screen television apparatus, for example. The display apparatus 101 has a configuration in which a flat plate-shaped body 102 for image display is supported by a stand 103. It is to be noted that the display apparatus 101 is used as a stationary display apparatus that is placed on a horizontal surface of a floor, a shelf, a table or the like in a state in which the stand 103 is attached to the body 102. Alternatively, the display apparatus 101 may be used as a wall-mounted display apparatus in a state in which the stand 103 is detached from the body 102.

FIG. 12 is an exploded view of the body 102 illustrated in FIG. 11. The body 102 includes, for example, a front exterior member (a bezel) 111, a panel module 112, and a rear exterior member (a rear cover) 113 in this order from front side (viewer side). The front exterior member 111 is a frame-like member that covers a peripheral edge of a front surface of the panel module 112, and a pair of speakers 114 are disposed on a lower portion of the frame-like member. The panel module 112 is fixed to the front exterior member 111. A power supply board 115 and a signal board 116 are mounted on a rear surface of the panel module 112, and a fixing bracket 117 is fixed to the rear surface of the panel module 112. The fixing bracket 117 is for fixing a wall mounting bracket, fixing the boards or the like, and fixing the stand 103. The rear exterior member 113 covers the rear surface and a side surface of the panel module 112.

FIG. 13 is an exploded view of the panel module 112 illustrated in FIG. 12. The panel module 112 includes, for example, a front housing (a top chassis) 121, a liquid crystal panel 122, a frame-like member (a middle chassis) 123, the light-emitting device 100, a rear housing (a back chassis) 124, and a timing controller board 127 in this order from the front side (the viewer side).

The front housing 121 is a frame-like metal component that covers a peripheral edge of a front surface of the liquid crystal panel 122. The liquid crystal panel 122 includes, for example, a liquid crystal cell 122A, a source board 122B, and a flexible board 122C such as a COF (Chip On Film) that couples these components. The frame-like member 123 is a frame-like resin component that holds the liquid crystal panel 122. The rear housing 124 is a metal component including iron (Fe) or the like and containing the liquid crystal panel 122, the frame-like member 123, and the light-emitting device 100. The timing controller board 127 is also mounted on a rear surface of the rear housing 124.

FIG. 14 is a schematic plan view of a more specific configuration example of the panel module 112. In the example of the light-emitting device 100 illustrated in FIG. 14, twelve light source units 10 in total are arranged in a region corresponding to a display region of the liquid crystal panel 122 extending in an H direction (a horizontal direction) and a V direction (a vertical direction). Specifically, six rows of the light source units 10 are aligned in the H direction, and two rows of the light source units 10 are aligned in the V direction. In each of the light source units 10, for example, longitudinal directions of the multiple light source boards 1 correspond to the H direction, and a longitudinal direction of the relay board 20 corresponds to the V direction. It is to be noted that illustration of the flexible film 30 is omitted in FIG. 14. As illustrated in FIG. 10, in the panel module 112, the timing controller board 127 is provided in a central region of the light-emitting device 100, for example. The timing controller board 127 and the multiple light source units 10 (10-1 to 10-12) are respectively coupled to each other with, for example, cables CB (CB1 to CB12) and connectors CN (CN1 to CN12).

2.2 Workings and Effects

In the display apparatus 101, the liquid crystal panel 122 selectively passes light from the light-emitting device 100 to display images. Here, as described in the first embodiment, an improvement in display quality of the display apparatus 101 is expected since the display apparatus 101 includes the light-emitting device 100 having excellent light-emission controllability and enhanced light-emission efficiency.

3. Other Modification Examples

Although the present disclosure has been described above with reference to the embodiments and the modification examples, the present disclosure is not limited to the above-described embodiments and the like, and may be modified in a variety of ways. For example, materials, types, arrangement positions, shapes, and the like of the constituent elements of the light-emitting device described in the above embodiments are not limited to those described above.

3.1 Modification Example 3-1

FIG. 15 is an enlarged cross-sectional view of a part of a light-emitting device 100A according to a modification example 3-1 of the present disclosure. In the first embodiment described above, the light-emitting element 21 is sealed with the sealing lens 22; however, the present disclosure is not limited thereto. The light-emitting device 100A includes a light source 2A instead of the light source 2. The light source 2A has a light-emitting element 21A instead of the light-emitting element 21, and has a cap lens 22A instead of the sealing lens 22.

The light-emitting element 21A is, for example, a packaged blue LED. Specifically, the light-emitting element 21A includes a light-emitting layer 26, a base 27, and a sealing material 28. The base 27 has a holding portion having a recessed shape. The light-emitting layer 26 is disposed on a bottom surface of the holding portion of the base 27. The holding portion of the base 27 is filled with the sealing material 28. The light-emitting layer 26 is, for example, a point light source, and is specifically a blue LED. The base 27 is mounted on the light source board 1 by soldering or the like via an external electrode including a lead frame or the like. The holding portion of the base 27 preferably has a surface having a high reflectance with respect to light from the light-emitting layer 26. The surface of the holding portion of the base 27 may include, for example, Ag as a material having a high reflectance. The sealing material 28 includes, for example, a transparent resin such as silicone or acrylic. The cap lens 22A is disposed directly above the light-emitting element 21A while being spaced apart from the light-emitting element 21A. At a center position of the cap lens 22A, an incident surface 22A1 having a concave shape toward the light-emitting element 21A is provided so as to be opposed to the light-emitting element 21A in the Z-axis direction. In addition, the cap lens 22A has an exit surface 22A2 having a convex shape toward the diffusion sheet 7, for example. The incident surface 22A1 and the exit surface 22A2 each exert a diffusing action on the blue light LB from the light-emitting element 21A.

In the light-emitting device 100A having such a configuration, the blue light emitted from the light-emitting element 21A is diffused by the cap lens 22A and the diffusion sheet 7, and then converted from the blue light to white light when passing through the wavelength conversion sheet 8. The white light obtained as a result of the conversion of the blue light is further subjected to luminance enhancement or uniformized by the optical sheet group 9, and is incident onto the liquid crystal display panel or the like.

3.2 Modification Example 3-2

In the light-emitting device 100A according to the modification example 3-1 described above, the packaged blue LED is used as the light-emitting element 21A; however, the present disclosure is not limited thereto. For example, as with a light-emitting element 21B of a light-emitting device 100B according to a modification example 3-2 of the present disclosure illustrated in FIG. 16, a packaged white LED may be adopted instead of the packaged blue LED. The light-emitting element 21B includes: the light-emitting layer 26 including, for example, a blue LED; the base 27; and a sealing material 29 including a transparent resin containing wavelength conversion substances. It is to be noted that, in the light-emitting device 100B, the wavelength conversion sheet 8 is unnecessary. This is advantageous to reduce the thickness of the entire configuration, as compared with the light-emitting device 100A of FIG. 15.

3.3 Modification Example 3-3

Further, the light-emitting device of the present disclosure is not limited to the one in which a lens is disposed on emission side of the light-emitting element. For example, as with a light-emitting device 100C according to a modification example 3-3 of the present disclosure illustrated in FIG. 17, multiple light-emitting elements 21C that are packaged blue LEDs, for example, may be arranged without providing various lenses. Each of the light-emitting elements 21C has substantially the same configuration as the configuration of the light-emitting element 21A illustrated in FIG. 15, and includes the light-emitting layer 26 including, for example, a blue LED, the base 27, and the sealing material 28. In the light-emitting device 100C having such a configuration, blue light emitted from the light-emitting element 21C is diffused by the diffusion sheet 7, and then converted from the blue light to white light when passing through the wavelength conversion sheet 8. The white light obtained as a result of the conversion of the blue light is further subjected to luminance enhancement or uniformized by the optical sheet group 9, and is incident onto the liquid crystal display panel or the like.

3.4 Modification Example 3-4

In the light-emitting device 100C according to the modification example 3-3 described above, the packaged blue LED is used as the light-emitting element 21C; however, the present disclosure is not limited thereto. For example, as with a light-emitting element 21D of a light-emitting device 100D according to a modification example 3-4 of the present disclosure illustrated in FIG. 18, a packaged white LED may be adopted instead of the packaged blue LED. The light-emitting element 21D has substantially the same configuration as the configuration of the light-emitting element 21B illustrated in FIG. 16, and includes, for example: the light-emitting layer 26 including, for example, a blue LED; the base 27; and the sealing material 29 including a transparent resin containing wavelength conversion substances.

3.5 Modification Example 3-5

A light-emitting device 100E according to a modification example 3-5 of the present disclosure illustrated in FIG. 19 includes a light-emitting element 21E having a dome-shaped sealing material 28. The light-emitting element 21E has a configuration substantially the same as the configuration of the light-emitting element 21C except that the shape of the sealing material 28 differs. Since the sealing material 28 in the light-emitting element 21E has a dome shape, the sealing material 28 is allowed to have a lensing effect. Therefore, desired alignment performance is easily obtainable.

3.6 Modification Example 3-6

A light-emitting device 100F according to a modification example 3-6 of the present disclosure illustrated in FIG. 20 includes a light-emitting element 21F having a dome-shaped sealing material 29. The light-emitting element 21F has a configuration substantially the same as the configuration of the light-emitting element 21D except that the shape of the sealing material 28 differs. Since the sealing material 29 in the light-emitting element 21F has a dome shape, the sealing material 29 is allowed to have a lensing effect. Therefore, desired alignment performance is easily obtainable.

3.7 Modification Example 3-7

Although the display apparatus 101 including the liquid crystal panel 122 has been described as an example in the second embodiment described above, the present disclosure is not limited thereto. That is, although the light-emitting device 100 is used as the backlight of the liquid crystal panel 122 in the display apparatus 101, the light-emitting device 100 may be used as a display panel.

FIG. 21 schematically illustrates a display apparatus 201 including a display panel 200. The display apparatus 201 includes a display panel 210 and a control circuit 220 that controls driving of the display panel 210. The display apparatus 201 is what is called an LED display in which an LED is used as a display pixel. That is, the light source 2 of the light-emitting device 100 is used as a display pixel. The display panel 210 is formed by superimposing a mounting board 210A including the light-emitting device 100 and a counter board 210B on each other. The counter board 210B has an image display surface on a front surface (a surface opposite to the mounting board 210A), has a display region at a center portion thereof, and has a frame region serving as a non-display region around the display region. The counter board 210B is disposed, for example, at a position opposed to the mounting board 210A with a predetermined gap therebetween. It is to be noted that the counter board 210B may be in contact with an upper surface of the mounting board 210A. The counter board 210B includes, for example, a light-transmitting substrate that transmits visible light. Examples of the light-transmitting substrate include a glass substrate, a transparent resin substrate, and a transparent resin film.

Further, the effects described in the present specification are merely examples and are not limited to the description, and other effects may be obtained. For example, the light source of the present disclosure is not limited to either one of a white light source and a blue light source, and may be a light source that emits another color, such as a red light source or a green light source. In the light-emitting device of the present disclosure, white light may be generated with use of red light, green light, and blue light from light sources of three kinds including a red light source, a green light source, and a blue light source. Controlling the amount of emitted light of each color more finely makes it possible to reduce power consumption.

In addition, in the above-described light-emitting device 100 and the like, a leaf spring is used as the elastic section; however, the present disclosure is not limited thereto. For example, any other elastic member such as a coil spring may be used as the elastic section.

In addition, in the above-described light-emitting device 100 and the like, the pressure contact terminal is interposed between the light source unit and a relay member; however, the present disclosure is not limited thereto. For example, as illustrated in FIG. 22, it is possible for the light-emitting device of the present disclosure to adopt a pressure contact terminal 50A of a clip type. The pressure contact terminal 50A holds the light source unit 10 and the relay board 20 between a pair of elastic sections 52A and 52B. The pressure contact terminal 50A includes an electrically conductive material. The elastic section 52A is in pressure contact with the first terminal 11, and the elastic section 52B is in pressure contact with the second terminal 12. Even in a case of using such a pressure contact terminal 50A, it is possible to bring the elastic sections 52A and 52B into pressure contact with the first terminal 11 and the second terminal 12 by mechanical biasing force and electrically couple the first terminal 11 and the second terminal 12. Accordingly, the pressure contact terminal 50A has effects similar to those of the pressure contact terminal 50 of the light-emitting device 100 according to the first embodiment described above.

Further, in the above-described light-emitting device 100 and the like, the flexible film 30 is bonded to the light-emitting surface of each light source unit 10, and the multiple light source units 10 are fixed to the flexible film 30. However, the flexible film 30 may be bonded to the back surface, which is opposite to the light-emitting surface, of each light source unit 10.

In addition, in the above-described light-emitting device 100 and the like, a case has been exemplified where the extending direction of the light source board 1 of each light source unit 10 is perpendicular to an opposed direction in which the light source unit 10 and the relay board 20 are opposed to each other; however, the present disclosure is not limited thereto. The extending direction of the light source board 1 and the opposed direction of the light source unit 10 and the relay board 20 may intersect with each other at an angle other than 90°. Likewise, in the above-described light-emitting device 100 and the like, the back chassis 60 and the light source unit 10 relatively move in the −X direction to thereby engage the opening 1K and the hook 60K with each other; however, the present disclosure is not limited thereto. Further, the present technology may have the following configurations.

(1)

A light-emitting device including:

multiple light source units each including a light source board, multiple light sources, and a first terminal, the light source board extending in a first direction, the multiple light sources arranged in the first direction on the light source board, and the first terminal that is coupled to the multiple light sources;

a relay member opposed to the multiple light source units in a second direction intersecting with the first direction, and including multiple second terminals that are each electrically coupled to a corresponding one of the first terminals of the multiple light source units; and a pressure contact terminal that is brought into pressure contact with at least one of the first terminal or the second terminal by mechanical biasing force and electrically couples the first terminal and the second terminal.

(2)

The light-emitting device according to (1), in which the pressure contact terminal includes an elastic section exhibiting elasticity, and the elastic section is configured to bend in the second direction.

(3)

The light-emitting device according to (2), further including a supporting body that supports the multiple light source units and the relay member.

(4)

The light-emitting device according to (3), further including a control board provided on the supporting body, and controls driving of the multiple light sources.

(5)

The light-emitting device according to (3) or (4), in which the multiple light source units each include a first engagement section, the supporting body includes multiple second engagement sections that are each engaged with a corresponding one of the first engagement sections in the multiple light source units, the elastic section extends in a third direction, and the supporting body and the light source unit relatively move in the third direction to thereby engage the first engagement section and the second engagement section with each other.

(6)

The light-emitting device according to (5), in which the multiple light source units each include a first fitting section, the supporting body includes multiple second fitting sections that are each fit with a corresponding one of the first fitting sections in the multiple light source units, and the supporting body and the light source unit relatively move in the third direction to thereby fit the second fitting section and the first fitting section with each other at a position where the first engagement section and the second engagement section are engaged with each other.

(7)

The light-emitting device according to (1), in which the multiple light source units each include a third engagement section, and the relay member includes multiple fourth engagement sections that are each engaged with a corresponding one of the third engagement sections in the multiple light source units.

(8)

The light-emitting device according to (3), in which the multiple light source units and the relay member are fixed to the supporting body by adhesion, screw fastening, or fitting.

(9)

The light-emitting device according to (2), in which the elastic section of the pressure contact terminal includes a leaf spring or a coil spring.

(10)

The light-emitting device according to any one of (1) to (9), in which the multiple light source units are aligned spaced apart from each other in a second direction perpendicular to the first direction.

(11)

The light-emitting device according to (10), in which a width of each of the multiple light source units in the second direction is narrower than an interval of adjacent ones in the second direction of the multiple light source units.

(12)

The light-emitting device according to any one of (1) to (11), in which the multiple light sources each include a white light source, or the multiple light sources include a red light source, a green light source, and a blue light source.

(13)

The light-emitting device according to any one of (1) to (11), further including a wavelength conversion member, in which the multiple light sources include blue light sources, and the wavelength conversion member converts blue light from the blue light sources into white light.

(14)

The light-emitting device according to (13), in which the wavelength conversion member includes a quantum dot.

(15)

A display apparatus including:

a light-emitting device; and a display panel that displays an image using light from the light-emitting device, in which the light-emitting device includes multiple light source units each including a light source board, multiple light sources, and a first terminal, the light source board extending in a first direction, the multiple light sources arranged in the first direction on the light source board, and the first terminal that is coupled to the multiple light sources, a relay member opposed to the multiple light source units in a second direction intersecting with the first direction, and including multiple second terminals that are each electrically coupled to a corresponding one of the first terminals of the multiple light source units, and a pressure contact terminal that is brought into pressure contact with at least one of the first terminal or the second terminal by mechanical biasing force and electrically couples the first terminal and the second terminal.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light-emitting device comprising:

multiple light source units each including a light source board, multiple light sources, and a first terminal, the light source board extending in a first direction, the multiple light sources arranged in the first direction on the light source board, and the first terminal that is coupled to the multiple light sources;

a relay member opposed to the multiple light source units in a second direction intersecting with the first direction, and including multiple second terminals that are each electrically coupled to a corresponding one of the first terminals of the multiple light source units;

a pressure contact terminal that is brought into pressure contact with at least one of the first terminal or the second terminal by mechanical biasing force and electrically couples the first terminal and the second terminal; and a supporting body that supports the multiple light source units and the relay member, wherein the pressure contact terminal includes an elastic section exhibiting elasticity, the elastic section is configured to bend in a third direction, the multiple light source units each include a first engagement section, the supporting body includes multiple second engagement sections that are each engaged with a corresponding one of the first engagement sections in the multiple light source units, the elastic section extends in the first direction, and the supporting body and the light source unit relatively move in the first direction to thereby engage the first engagement section and the second engagement section with each other.

2. The light-emitting device according to claim 1, further comprising a control board provided on the supporting body, and controls driving of the multiple light sources.

3. The light-emitting device according to claim 1, wherein the multiple light source units each include a first fitting section, the supporting body includes multiple second fitting sections that are each fit with a corresponding one of the first fitting sections in the multiple light source units, and the supporting body and the light source unit relatively move in the first direction to thereby fit the second fitting section and the first fitting section with each other at a position where the first engagement section and the second engagement section are engaged with each other.

4. The light-emitting device according to claim 1, wherein the multiple light source units each include a third engagement section, and the relay member includes multiple fourth engagement sections that are each engaged with a corresponding one of the third engagement sections in the multiple light source units.

5. The light-emitting device according to claim 1, wherein the multiple light source units and the relay member are fixed to the supporting body by adhesion, screw fastening, or fitting.

6. The light-emitting device according to claim 1, wherein the elastic section of the pressure contact terminal comprises a leaf spring or a coil spring.

7. The light-emitting device according to claim 1, wherein the multiple light source units are aligned spaced apart from each other in the second direction perpendicular to the first direction.

8. The light-emitting device according to claim 7, wherein a width of each of the multiple light source units in the second direction is narrower than an interval of adjacent ones in the second direction of the multiple light source units.

9. The light-emitting device according to claim 1, wherein the multiple light sources each comprise a white light source, or the multiple light sources include a red light source, a green light source, and a blue light source.

10. A display apparatus comprising:

a light-emitting device; and a display panel that displays an image using light from the light-emitting device, wherein the light-emitting device includes multiple light source units each including a light source board, multiple light sources, and a first terminal, the light source board extending in a first direction, the multiple light sources arranged in the first direction on the light source board, and the first terminal that is coupled to the multiple light sources, a relay member opposed to the multiple light source units in a second direction intersecting with the first direction, and including multiple second terminals that are each electrically coupled to a corresponding one of the first terminals of the multiple light source units, a pressure contact terminal that is brought into pressure contact with at least one of the first terminal or the second terminal by mechanical biasing force and electrically couples the first terminal and the second terminal, and a supporting body that supports the multiple light source units and the relay member, wherein the pressure contact terminal includes an elastic section exhibiting elasticity, the elastic section is configured to bend in a third direction, the multiple light source units each include a first engagement section, the supporting body includes multiple second engagement sections that are each engaged with a corresponding one of the first engagement sections in the multiple light source units, the elastic section extends in the first direction, and the supporting body and the light source unit relatively move in the first direction to thereby engage the first engagement section and the second engagement section with each other.

11. The display apparatus according to claim 10, further comprising a control board provided on the supporting body, and controls driving of the multiple light sources.

12. The display apparatus according to claim 10, wherein the multiple light source units each include a first fitting section, the supporting body includes multiple second fitting sections that are each fit with a corresponding one of the first fitting sections in the multiple light source units, and the supporting body and the light source unit relatively move in the first direction to thereby fit the second fitting section and the first fitting section with each other at a position where the first engagement section and the second engagement section are engaged with each other.

13. The display apparatus according to claim 10, wherein the multiple light source units each include a third engagement section, and the relay member includes multiple fourth engagement sections that are each engaged with a corresponding one of the third engagement sections in the multiple light source units.

14. The display apparatus according to claim 10, wherein the multiple light source units and the relay member are fixed to the supporting body by adhesion, screw fastening, or fitting.

15. The display apparatus according to claim 10, wherein the elastic section of the pressure contact terminal comprises a leaf spring or a coil spring.

16. The display apparatus according to claim 10, wherein the multiple light source units are aligned spaced apart from each other in the second direction perpendicular to the first direction.

17. The display apparatus according to claim 16, wherein a width of each of the multiple light source units in the second direction is narrower than an interval of adjacent ones in the second direction of the multiple light source units.

18. The display apparatus according to claim 10, wherein the multiple light sources each comprise a white light source, or the multiple light sources include a red light source, a green light source, and a blue light source.

19. The display apparatus according to claim 10, further comprising a wavelength conversion member, wherein the multiple light sources comprise blue light sources, and the wavelength conversion member converts blue light from the bule light sources into white light.

20. The display apparatus according to claim 19, wherein the wavelength conversion member includes a quantum dot.

* * * * *